US009542553B1

(12) United States Patent
Burger et al.

(10) Patent No.: US 9,542,553 B1
(45) Date of Patent: *Jan. 10, 2017

(54) SYSTEMS AND METHODS OF IDENTITY PROTECTION AND MANAGEMENT

(71) Applicant: ConsumerInfo.com, Inc., Costa Mesa, CA (US)

(72) Inventors: Michael Burger, Aliso Viejo, CA (US); Mark Joseph Kapczynski, Santa Monica, CA (US)

(73) Assignee: Consumerinfo.com, Inc., Costa Mesa, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/819,824

(22) Filed: Aug. 6, 2015

Related U.S. Application Data

(63) Continuation of application No. 13/234,637, filed on Sep. 16, 2011, now Pat. No. 9,106,691.

(51) Int. Cl.
*G06F 21/62* (2013.01)
*G06F 21/55* (2013.01)
*H04L 29/06* (2006.01)

(52) U.S. Cl.
CPC .......... *G06F 21/552* (2013.01); *G06F 21/554* (2013.01); *G06F 21/6245* (2013.01);
(Continued)

(58) Field of Classification Search
CPC ...... G06F 21/55; G06F 21/552; G06F 21/554; G06F 2201/86; G06F 2201/875; G06F 2201/03; H04L 67/025; H04L 67/22; H04L 63/14; H04L 63/1408; H04L 63/1416; H04L 63/1425; H04L 29/06884; H04L 29/06891
See application file for complete search history.

(56) References Cited

U.S. PATENT DOCUMENTS 3,405,457 A 10/1968 Bitzer
4,346,442 A 8/1982 Musmanno
(Continued)

FOREIGN PATENT DOCUMENTS

EP 0 542 298 5/1993
EP 1 028 401 8/2000
(Continued)

OTHER PUBLICATIONS

"Equifax: Debt Wise™ Credit Monitoring Service," Product Review, http://www.mdmproofing.com/lym/reviews/equifax/debt-wise/, Jan. 2010, pp. 11.
(Continued)

*Primary Examiner* — Eleni Shiferaw
*Assistant Examiner* — Nelson Giddins
(74) *Attorney, Agent, or Firm* — Knobbe, Martens, Olson & Bear LLP

(57) ABSTRACT

In an embodiment, a computing system, such as a monitoring computer, receives a request from a user to monitor an account of the user with an online service provider. The request may include personal information and user preferences for one or more protective actions. The system periodically monitors external data sources for indications of changes to personal information associated with the account, and detects changes or attempted changes to personal information associated with the account. The system may determine risk levels associated with detected changes or attempted changes, and transmit a notification to the user via a communication channel selected based on the determined risk level and/or the user preferences. The system may also initiate protective actions, so that further unauthorized access to the account may be prevented.

15 Claims, 9 Drawing Sheets

(52) U.S. Cl.
CPC .. *G06F 2221/032* (2013.01); *H04L 29/06884* (2013.01); *H04L 29/06891* (2013.01)

(56) References Cited

U.S. PATENT DOCUMENTS

| | | | |
|---|---|---|---|
| 4,734,858 A | 3/1988 | Schlafly | |
| 4,755,940 A | 7/1988 | Brachtl et al. | |
| 4,774,664 A | 9/1988 | Campbell et al. | |
| 4,795,890 A | 1/1989 | Goldman | |
| 4,891,503 A | 1/1990 | Jewell | |
| 4,977,595 A | 12/1990 | Ohta et al. | |
| 4,989,141 A | 1/1991 | Lyons et al. | |
| 5,126,936 A | 6/1992 | Champion et al. | |
| 5,148,365 A | 9/1992 | Dembo | |
| 5,220,501 A | 6/1993 | Lawlor et al. | |
| 5,262,941 A | 11/1993 | Saladin | |
| 5,274,547 A | 12/1993 | Zoffel et al. | |
| 5,336,870 A | 8/1994 | Hughes et al. | |
| 5,351,293 A | 9/1994 | Michener et al. | |
| 5,383,113 A | 1/1995 | Kight et al. | |
| 5,404,518 A | 4/1995 | Gilbertson et al. | |
| 5,500,513 A | 3/1996 | Langhans et al. | |
| 5,590,038 A | 12/1996 | Pitroda | |
| 5,592,560 A | 1/1997 | Deaton et al. | |
| 5,640,577 A | 6/1997 | Scharmer | |
| 5,659,725 A | 8/1997 | Levy et al. | |
| 5,659,731 A | 8/1997 | Gustafson | |
| 5,715,314 A | 2/1998 | Payne et al. | |
| 5,719,941 A | 2/1998 | Swift et al. | |
| 5,729,735 A | 3/1998 | Meyering | |
| 5,739,512 A | 4/1998 | Tognazzini | |
| 5,754,632 A | 5/1998 | Smith | |
| 5,819,234 A | 10/1998 | Slavin et al. | |
| 5,832,068 A | 11/1998 | Smith | |
| 5,842,211 A | 11/1998 | Horadan et al. | |
| 5,844,218 A | 12/1998 | Kawan et al. | |
| 5,870,721 A | 2/1999 | Norris | |
| 5,878,403 A | 3/1999 | DeFrancesco | |
| 5,881,131 A | 3/1999 | Farris et al. | |
| 5,884,302 A | 3/1999 | Ho | |
| 5,903,830 A | 5/1999 | Joao et al. | |
| 5,903,881 A | 5/1999 | Schrader et al. | |
| 5,930,776 A | 7/1999 | Dykstra et al. | |
| 5,956,693 A | 9/1999 | Geerlings | |
| 5,963,939 A | 10/1999 | McCann et al. | |
| 5,966,695 A | 10/1999 | Melchione et al. | |
| 5,978,780 A | 11/1999 | Watson | |
| 5,995,947 A | 11/1999 | Fraser et al. | |
| 5,999,596 A | 12/1999 | Walker et al. | |
| 6,006,333 A | 12/1999 | Nielsen | |
| 6,009,415 A | 12/1999 | Shurling et al. | |
| 6,014,645 A | 1/2000 | Cunningham | |
| 6,021,397 A | 2/2000 | Jones et al. | |
| 6,021,943 A | 2/2000 | Chastain | |
| 6,026,440 A | 2/2000 | Shrader et al. | |
| 6,029,149 A | 2/2000 | Dykstra et al. | |
| 6,038,551 A | 3/2000 | Barlow et al. | |
| 6,064,990 A | 5/2000 | Goldsmith | |
| 6,072,894 A | 6/2000 | Payne | |
| 6,073,106 A | 6/2000 | Rozen et al. | |
| 6,073,140 A | 6/2000 | Morgan et al. | |
| 6,085,242 A | 7/2000 | Chandra | |
| 6,088,686 A | 7/2000 | Walker et al. | |
| 6,112,190 A | 8/2000 | Fletcher et al. | |
| 6,119,103 A | 9/2000 | Basch et al. | |
| 6,128,602 A | 10/2000 | Northington et al. | |
| 6,149,441 A | 11/2000 | Pellegrino et al. | |
| 6,157,707 A | 12/2000 | Baulier et al. | |
| 6,161,139 A | 12/2000 | Win et al. | |
| 6,178,420 B1 | 1/2001 | Sassano | |
| 6,182,068 B1 | 1/2001 | Culliss | |
| 6,182,229 B1 | 1/2001 | Nielsen | |
| 6,202,053 B1 | 3/2001 | Christiansen et al. | |
| 6,202,067 B1 | 3/2001 | Blood et al. | |
| 6,233,566 B1 | 5/2001 | Levine et al. | |
| 6,247,000 B1 | 6/2001 | Hawkins et al. | |
| 6,253,202 B1 | 6/2001 | Gilmour | |
| 6,254,000 B1 | 7/2001 | Degen et al. | |
| 6,263,447 B1 | 7/2001 | French et al. | |
| 6,269,369 B1 | 7/2001 | Robertson | |
| 6,282,658 B2 | 8/2001 | French et al. | |
| 6,295,541 B1 | 9/2001 | Bodnar et al. | |
| 6,304,860 B1 | 10/2001 | Martin et al. | |
| 6,311,169 B2 | 10/2001 | Duhon | |
| 6,321,339 B1 | 11/2001 | French et al. | |
| 6,327,578 B1 | 12/2001 | Linehan | |
| 6,330,551 B1 | 12/2001 | Burchetta et al. | |
| 6,343,279 B1 | 1/2002 | Bissonette et al. | |
| 6,353,778 B1 | 3/2002 | Brown | |
| 6,356,937 B1 | 3/2002 | Montville et al. | |
| 6,374,262 B1 | 4/2002 | Kodama | |
| 6,384,844 B1 | 5/2002 | Stewart et al. | |
| 6,386,444 B1 | 5/2002 | Sullivan | |
| 6,397,197 B1 | 5/2002 | Gindlesperger | |
| 6,397,212 B1 | 5/2002 | Biffar | |
| 6,405,181 B2 | 6/2002 | Lent et al. | |
| 6,421,675 B1 | 7/2002 | Ryan et al. | |
| 6,421,729 B1 | 7/2002 | Paltenghe et al. | |
| 6,422,462 B1 | 7/2002 | Cohen | |
| 6,453,353 B1 | 9/2002 | Win et al. | |
| 6,457,012 B1 | 9/2002 | Jatkowski | |
| 6,463,533 B1 | 10/2002 | Calamera et al. | |
| 6,473,740 B2 | 10/2002 | Cockril et al. | |
| 6,496,936 B1 | 12/2002 | French et al. | |
| 5,870,721 C1 | 1/2003 | Norris | |
| 6,523,021 B1 | 2/2003 | Monberg et al. | |
| 6,523,041 B1 | 2/2003 | Morgan et al. | |
| 6,539,377 B1 | 3/2003 | Culliss | |
| 6,539,392 B1 | 3/2003 | Rebane | |
| 6,543,683 B2 | 4/2003 | Hoffman | |
| 6,564,210 B1 | 5/2003 | Korda et al. | |
| 6,567,791 B2 | 5/2003 | Lent et al. | |
| 6,571,236 B1 | 5/2003 | Ruppelt | |
| 6,574,736 B1 | 6/2003 | Andrews | |
| 6,581,025 B2 | 6/2003 | Lehman | |
| 6,581,059 B1 | 6/2003 | Barrett et al. | |
| 6,587,841 B1 | 7/2003 | DeFrancesco | |
| 6,601,173 B1 | 7/2003 | Mohler | |
| 6,611,816 B2 | 8/2003 | Lebda et al. | |
| 6,615,193 B1 | 9/2003 | Kingdon et al. | |
| 6,629,245 B1 | 9/2003 | Stone et al. | |
| 6,647,383 B1 | 11/2003 | August et al. | |
| 6,658,393 B1 | 12/2003 | Basch et al. | |
| 6,665,715 B1 | 12/2003 | Houri | |
| 6,678,694 B1 | 1/2004 | Zimmermann et al. | |
| 6,703,930 B2 | 3/2004 | Skinner | |
| 6,714,944 B1 | 3/2004 | Shapiro et al. | |
| 6,718,313 B1 | 4/2004 | Lent et al. | |
| 6,725,381 B1 | 4/2004 | Smith et al. | |
| 6,734,886 B1 | 5/2004 | Hagan et al. | |
| 6,745,938 B2 | 6/2004 | Sullivan | |
| 6,750,985 B2 | 6/2004 | Rhoads | |
| 6,754,665 B1 | 6/2004 | Futagami et al. | |
| 6,766,327 B2 | 7/2004 | Morgan, Jr. et al. | |
| 6,766,946 B2 | 7/2004 | Iida et al. | |
| 6,781,608 B1 | 8/2004 | Crawford | |
| 6,782,379 B2 | 8/2004 | Lee | |
| 6,792,088 B2 | 9/2004 | Takeuchi | |
| 6,792,263 B1 | 9/2004 | Kite | |
| 6,796,497 B2 | 9/2004 | Benkert et al. | |
| 6,804,346 B1 | 10/2004 | Mewhinney | |
| 6,805,287 B2 | 10/2004 | Bishop et al. | |
| 6,807,533 B1 | 10/2004 | Land et al. | |
| 6,810,323 B1 | 10/2004 | Bullock et al. | |
| 6,816,850 B2 | 11/2004 | Culliss | |
| 6,816,871 B2 | 11/2004 | Lee | |
| 6,845,448 B1 | 1/2005 | Chaganti et al. | |
| 6,857,073 B2 | 2/2005 | French et al. | |
| 6,871,287 B1 | 3/2005 | Ellingson | |
| 6,892,307 B1 | 5/2005 | Wood et al. | |
| 6,900,731 B2 | 5/2005 | Kreiner et al. | |
| 6,907,408 B2 | 6/2005 | Angel | |
| 6,908,030 B2 | 6/2005 | Rajasekaran et al. | |
| 6,910,624 B1 | 6/2005 | Natsuno | |

(56) References Cited

U.S. PATENT DOCUMENTS

| | | | |
|---|---|---|---|
| 6,928,487 B2 | 8/2005 | Eggebraaten et al. | |
| 6,934,714 B2 | 8/2005 | Meinig | |
| 6,934,858 B2 | 8/2005 | Woodhill | |
| 6,941,323 B1 | 9/2005 | Galperin | |
| 6,947,989 B2 | 9/2005 | Gullotta et al. | |
| 6,950,807 B2 | 9/2005 | Brock | |
| 6,950,858 B2 | 9/2005 | Ogami | |
| 6,962,336 B2 | 11/2005 | Glass | |
| 6,965,881 B1 | 11/2005 | Brickell et al. | |
| 6,968,319 B1 | 11/2005 | Remington et al. | |
| 6,973,462 B2 | 12/2005 | Dattero et al. | |
| 6,983,381 B2 | 1/2006 | Jerdonek | |
| 6,985,887 B1 | 1/2006 | Sunstein et al. | |
| 6,988,085 B2 | 1/2006 | Hedy | |
| 6,993,572 B2 | 1/2006 | Ross, Jr. et al. | |
| 6,999,941 B1 | 2/2006 | Agarwal | |
| 7,013,315 B1 | 3/2006 | Boothby | |
| 7,016,907 B2 | 3/2006 | Boreham et al. | |
| 7,024,548 B1 * | 4/2006 | O'Toole, Jr. | 713/1 |
| 7,028,013 B2 | 4/2006 | Saeki | |
| 7,028,052 B2 | 4/2006 | Chapman et al. | |
| 7,039,607 B2 | 5/2006 | Watarai et al. | |
| 7,043,476 B2 | 5/2006 | Robson | |
| 7,046,139 B2 | 5/2006 | Kuhn et al. | |
| 7,058,386 B2 | 6/2006 | McGregor et al. | |
| 7,058,817 B1 | 6/2006 | Ellmore | |
| 7,059,531 B2 | 6/2006 | Beenau et al. | |
| 7,062,475 B1 | 6/2006 | Szabo et al. | |
| 7,069,240 B2 | 6/2006 | Spero et al. | |
| 7,072,909 B2 | 7/2006 | Polk | |
| 7,076,462 B1 | 7/2006 | Nelson et al. | |
| 7,085,727 B2 | 8/2006 | VanOrman | |
| 7,089,594 B2 | 8/2006 | Lal et al. | |
| 7,107,241 B1 | 9/2006 | Pinto | |
| 7,117,172 B1 | 10/2006 | Black | |
| 7,121,471 B2 | 10/2006 | Beenau et al. | |
| 7,124,144 B2 | 10/2006 | Christianson et al. | |
| 7,143,063 B2 | 11/2006 | Lent | |
| 7,154,375 B2 | 12/2006 | Beenau et al. | |
| 7,155,725 B1 * | 12/2006 | Kister et al. | 719/310 |
| 7,155,739 B2 | 12/2006 | Bari et al. | |
| 7,181,418 B1 | 2/2007 | Zucker et al. | |
| 7,181,427 B1 | 2/2007 | DeFrancesco | |
| 7,194,416 B1 | 3/2007 | Provost et al. | |
| 7,200,602 B2 | 4/2007 | Jonas | |
| 7,206,768 B1 | 4/2007 | deGroeve et al. | |
| 7,209,895 B2 | 4/2007 | Kundtz et al. | |
| 7,209,911 B2 | 4/2007 | Boothby et al. | |
| 7,212,995 B2 | 5/2007 | Schulkins | |
| 7,218,912 B2 | 5/2007 | Erskine et al. | |
| 7,219,107 B2 | 5/2007 | Beringer | |
| 7,222,369 B2 | 5/2007 | Vering et al. | |
| 7,234,156 B2 | 6/2007 | French et al. | |
| 7,234,160 B2 | 6/2007 | Vogel et al. | |
| 7,236,950 B2 | 6/2007 | Savage et al. | |
| 7,237,267 B2 | 6/2007 | Rayes et al. | |
| 7,243,369 B2 | 7/2007 | Bhat et al. | |
| 7,246,067 B2 | 7/2007 | Austin et al. | |
| 7,246,740 B2 | 7/2007 | Swift et al. | |
| 7,249,076 B1 | 7/2007 | Pendleton et al. | |
| 7,249,113 B1 | 7/2007 | Continelli et al. | |
| 7,263,497 B1 | 8/2007 | Wiser et al. | |
| 7,281,652 B2 | 10/2007 | Foss | |
| 7,289,971 B1 | 10/2007 | O'Neil et al. | |
| 7,296,734 B2 | 11/2007 | Pliha | |
| 7,302,272 B2 | 11/2007 | Ackley | |
| 7,303,120 B2 | 12/2007 | Beenau et al. | |
| 7,310,611 B2 | 12/2007 | Shibuya et al. | |
| 7,310,617 B1 | 12/2007 | Cunningham | |
| 7,314,167 B1 | 1/2008 | Kiliccote | |
| 7,315,837 B2 | 1/2008 | Sloan et al. | |
| 7,328,233 B2 | 2/2008 | Salim et al. | |
| 7,330,717 B2 | 2/2008 | Gidron et al. | |
| 7,330,835 B2 | 2/2008 | Deggendorf | |
| 7,333,635 B2 | 2/2008 | Tsantes et al. | |
| 7,340,679 B2 | 3/2008 | Botscheck et al. | |
| 7,343,149 B2 | 3/2008 | Benco et al. | |
| 7,343,295 B2 | 3/2008 | Pomerance | |
| 7,346,576 B2 | 3/2008 | Lent et al. | |
| 7,356,503 B1 | 4/2008 | Johnson et al. | |
| 7,356,516 B2 | 4/2008 | Richey et al. | |
| 7,366,694 B2 | 4/2008 | Lazerson | |
| 7,370,014 B1 | 5/2008 | Vasavada et al. | |
| 7,370,044 B2 | 5/2008 | Mulhern et al. | |
| 7,373,324 B1 | 5/2008 | Engin et al. | |
| 7,383,988 B2 | 6/2008 | Slonecker, Jr. | |
| 7,386,511 B2 | 6/2008 | Buchanan et al. | |
| 7,386,786 B2 | 6/2008 | Davis et al. | |
| 7,389,913 B2 | 6/2008 | Starrs | |
| 7,395,273 B2 | 7/2008 | Khan et al. | |
| 7,403,923 B2 | 7/2008 | Elliott et al. | |
| 7,403,942 B1 | 7/2008 | Bayliss | |
| 7,409,369 B1 | 8/2008 | Homuth et al. | |
| 7,412,228 B2 | 8/2008 | Barclay et al. | |
| 7,433,864 B2 | 10/2008 | Malik | |
| 7,437,679 B2 | 10/2008 | Uemura et al. | |
| 7,444,414 B2 | 10/2008 | Foster et al. | |
| 7,444,518 B1 | 10/2008 | Dharmarajan et al. | |
| 7,451,095 B1 | 11/2008 | Bradley et al. | |
| 7,451,113 B1 | 11/2008 | Kasower | |
| 7,458,508 B1 | 12/2008 | Shao et al. | |
| 7,460,857 B2 | 12/2008 | Roach, Jr. | |
| 7,467,401 B2 | 12/2008 | Cicchitto | |
| 7,475,032 B1 | 1/2009 | Patnode et al. | |
| 7,478,157 B2 | 1/2009 | Bohrer et al. | |
| 7,479,949 B2 | 1/2009 | Jobs et al. | |
| 7,480,631 B1 | 1/2009 | Merced et al. | |
| 7,490,356 B2 | 2/2009 | Lieblich et al. | |
| 7,503,489 B2 | 3/2009 | Heffez | |
| 7,509,117 B2 | 3/2009 | Yum | |
| 7,509,278 B2 | 3/2009 | Jones | |
| 7,512,221 B2 | 3/2009 | Toms | |
| 7,529,698 B2 | 5/2009 | Joao | |
| 7,530,097 B2 | 5/2009 | Casco-Arias et al. | |
| 7,536,329 B2 | 5/2009 | Goldberg et al. | |
| 7,536,348 B2 | 5/2009 | Shao et al. | |
| 7,542,922 B2 | 6/2009 | Bennett et al. | |
| 7,542,993 B2 | 6/2009 | Satterfield et al. | |
| 7,543,739 B2 | 6/2009 | Brown et al. | |
| 7,546,271 B1 | 6/2009 | Chmielewski et al. | |
| 7,548,886 B2 | 6/2009 | Kirkland et al. | |
| 7,552,086 B1 | 6/2009 | Rajasekar et al. | |
| 7,552,089 B2 | 6/2009 | Bruer et al. | |
| 7,552,467 B2 | 6/2009 | Lindsay | |
| 7,555,459 B2 | 6/2009 | Dhar et al. | |
| 7,558,748 B2 | 7/2009 | Ehring et al. | |
| 7,559,217 B2 | 7/2009 | Bass | |
| 7,562,184 B2 | 7/2009 | Henmi et al. | |
| 7,562,814 B1 | 7/2009 | Shao et al. | |
| 7,571,138 B2 | 8/2009 | Miri et al. | |
| 7,571,473 B1 | 8/2009 | Boydstun et al. | |
| 7,575,157 B2 | 8/2009 | Barnhardt et al. | |
| 7,577,665 B2 | 8/2009 | Ramer et al. | |
| 7,577,934 B2 | 8/2009 | Anonsen et al. | |
| 7,580,884 B2 | 8/2009 | Cook | |
| 7,581,112 B2 | 8/2009 | Brown et al. | |
| 7,584,126 B1 | 9/2009 | White | |
| 7,584,146 B1 | 9/2009 | Duhon | |
| 7,587,366 B2 | 9/2009 | Grim, III et al. | |
| 7,587,368 B2 | 9/2009 | Felsher | |
| 7,593,891 B2 | 9/2009 | Kornegay et al. | |
| 7,594,019 B2 | 9/2009 | Clapper | |
| 7,603,701 B2 | 10/2009 | Gaucas | |
| 7,606,725 B2 | 10/2009 | Robertson et al. | |
| 7,610,216 B1 | 10/2009 | May et al. | |
| 7,610,229 B1 | 10/2009 | Kornegay | |
| 7,613,600 B2 | 11/2009 | Krane | |
| 7,620,596 B2 | 11/2009 | Knudson et al. | |
| 7,620,653 B1 | 11/2009 | Swartz | |
| 7,623,844 B2 | 11/2009 | Herrmann et al. | |
| 7,630,903 B1 | 12/2009 | Vaidyanathan | |
| 7,630,932 B2 | 12/2009 | Danaher et al. | |
| 7,630,933 B2 | 12/2009 | Peterson et al. | |
| 7,634,737 B2 | 12/2009 | Beringer et al. | |

(56) References Cited

U.S. PATENT DOCUMENTS

| | | |
|---|---|---|
| 7,640,200 B2 | 12/2009 | Gardner et al. |
| 7,644,035 B1 | 1/2010 | Biffle et al. |
| 7,647,274 B2 | 1/2010 | Peterson et al. |
| 7,647,344 B2 | 1/2010 | Skurtovich, Jr. et al. |
| 7,653,592 B1 | 1/2010 | Flaxman et al. |
| 7,653,600 B2 | 1/2010 | Gustin |
| 7,653,688 B2 | 1/2010 | Bittner |
| 7,672,833 B2 | 3/2010 | Blume et al. |
| 7,676,410 B2 | 3/2010 | Petralia |
| 7,685,209 B1 | 3/2010 | Norton et al. |
| 7,686,214 B1 | 3/2010 | Shao et al. |
| 7,688,813 B2 | 3/2010 | Shin et al. |
| 7,689,487 B1 | 3/2010 | Britto et al. |
| 7,689,505 B2 | 3/2010 | Kasower |
| 7,689,563 B1 | 3/2010 | Jacobson |
| 7,690,032 B1 | 3/2010 | Peirce |
| 7,693,787 B2 | 4/2010 | Provinse |
| 7,698,214 B1 | 4/2010 | Lindgren |
| 7,698,217 B1 | 4/2010 | Phillips et al. |
| 7,698,445 B2 | 4/2010 | Fitzpatrick et al. |
| 7,707,122 B2 | 4/2010 | Hull et al. |
| 7,707,271 B2 | 4/2010 | Rudkin et al. |
| 7,708,190 B2 | 5/2010 | Brandt et al. |
| 7,711,635 B2 | 5/2010 | Steele et al. |
| 7,711,707 B2 | 5/2010 | Kelley |
| 7,715,832 B2 | 5/2010 | Zhou |
| 7,720,846 B1 | 5/2010 | Bayliss |
| 7,725,385 B2 | 5/2010 | Royer et al. |
| 7,729,959 B1 | 6/2010 | Wells et al. |
| 7,730,078 B2 | 6/2010 | Schwabe et al. |
| 7,734,522 B2 | 6/2010 | Johnson et al. |
| 7,734,637 B2 * | 6/2010 | Greifeneder et al. ........ 707/758 |
| 7,739,139 B2 | 6/2010 | Robertson et al. |
| 7,739,707 B2 | 6/2010 | Sie et al. |
| 7,747,494 B1 | 6/2010 | Kothari et al. |
| 7,747,520 B2 | 6/2010 | Livermore et al. |
| 7,747,521 B2 | 6/2010 | Serio |
| 7,756,789 B2 | 7/2010 | Welker et al. |
| 7,761,373 B2 | 7/2010 | Metz |
| 7,761,384 B2 | 7/2010 | Madhogarhia |
| 7,761,568 B1 | 7/2010 | Levi et al. |
| 7,765,148 B2 | 7/2010 | German et al. |
| 7,765,166 B2 | 7/2010 | Beringer et al. |
| 7,765,311 B2 | 7/2010 | Itabashi et al. |
| 7,769,696 B2 | 8/2010 | Yoda |
| 7,769,697 B2 | 8/2010 | Fieschi et al. |
| 7,774,257 B2 | 8/2010 | Maggioncalda et al. |
| 7,774,270 B1 | 8/2010 | MacCloskey |
| 7,783,515 B1 | 8/2010 | Kumar et al. |
| 7,787,869 B2 | 8/2010 | Rice et al. |
| 7,788,040 B2 | 8/2010 | Haskell et al. |
| 7,792,715 B1 | 9/2010 | Kasower |
| 7,792,725 B2 | 9/2010 | Booraem et al. |
| 7,792,903 B2 | 9/2010 | Fischer et al. |
| 7,793,835 B1 | 9/2010 | Coggeshall et al. |
| 7,797,252 B2 | 9/2010 | Rosskamm et al. |
| 7,797,725 B2 | 9/2010 | Lunt et al. |
| 7,801,807 B2 | 9/2010 | DeFrancesco et al. |
| 7,801,811 B1 | 9/2010 | Merrell et al. |
| 7,801,956 B1 | 9/2010 | Cumberbatch et al. |
| 7,802,104 B2 | 9/2010 | Dickinson |
| 7,805,362 B1 | 9/2010 | Merrell et al. |
| 7,809,398 B2 | 10/2010 | Pearson |
| 7,809,797 B2 | 10/2010 | Cooley et al. |
| 7,810,036 B2 | 10/2010 | Bales et al. |
| 7,814,002 B2 | 10/2010 | DeFrancesco et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,827,115 B2 | 11/2010 | Weller et al. |
| 7,832,006 B2 | 11/2010 | Chen et al. |
| 7,835,983 B2 | 11/2010 | Lefner et al. |
| 7,840,484 B2 | 11/2010 | Haggerty et al. |
| 7,841,004 B1 | 11/2010 | Balducci et al. |
| 7,841,008 B1 | 11/2010 | Cole et al. |
| 7,844,520 B1 | 11/2010 | Franklin |
| 7,844,604 B2 | 11/2010 | Baio et al. |
| 7,848,972 B1 | 12/2010 | Sharma |
| 7,848,978 B2 | 12/2010 | Imrey et al. |
| 7,849,014 B2 | 12/2010 | Erikson |
| 7,853,493 B2 | 12/2010 | DeBie et al. |
| 7,856,203 B2 | 12/2010 | Lipovski |
| 7,856,386 B2 | 12/2010 | Hazlehurst et al. |
| 7,865,958 B2 | 1/2011 | Lieblich et al. |
| 7,870,066 B2 | 1/2011 | Lin et al. |
| 7,870,078 B2 | 1/2011 | Clark et al. |
| 7,877,304 B1 | 1/2011 | Coulter |
| 7,877,784 B2 | 1/2011 | Chow et al. |
| 7,890,403 B1 | 2/2011 | Smith |
| 7,899,750 B1 | 3/2011 | Klieman et al. |
| 7,908,242 B1 | 3/2011 | Achanta |
| 7,909,246 B2 | 3/2011 | Hogg et al. |
| 7,912,842 B1 | 3/2011 | Bayliss et al. |
| 7,912,865 B2 | 3/2011 | Akerman et al. |
| 7,925,582 B1 | 4/2011 | Kornegay et al. |
| 7,925,982 B2 | 4/2011 | Parker |
| 7,954,698 B1 | 6/2011 | Pliha |
| 7,958,046 B2 | 6/2011 | Doerner et al. |
| 7,966,192 B2 | 6/2011 | Pagliari et al. |
| 7,970,676 B2 | 6/2011 | Feinstein |
| 7,970,679 B2 | 6/2011 | Kasower |
| 7,970,698 B2 | 6/2011 | Gupta et al. |
| 7,975,299 B1 | 7/2011 | Balducci et al. |
| 7,979,908 B2 | 7/2011 | Millwee |
| 7,983,932 B2 | 7/2011 | Kane |
| 7,987,501 B2 | 7/2011 | Miller et al. |
| 7,991,688 B2 | 8/2011 | Phelan et al. |
| 8,001,153 B2 | 8/2011 | Skurtovich, Jr. et al. |
| 8,001,235 B2 | 8/2011 | Russ et al. |
| 8,006,261 B1 | 8/2011 | Haberman et al. |
| 8,032,932 B2 | 10/2011 | Speyer et al. |
| 8,036,941 B2 | 10/2011 | Bennett et al. |
| 8,037,097 B2 | 10/2011 | Guo et al. |
| 8,055,904 B1 | 11/2011 | Cato et al. |
| 8,060,424 B2 | 11/2011 | Kasower |
| 8,060,438 B2 | 11/2011 | Dhar et al. |
| 8,060,916 B2 | 11/2011 | Bajaj et al. |
| 8,065,233 B2 | 11/2011 | Lee et al. |
| 8,078,453 B2 | 12/2011 | Shaw |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,078,881 B1 | 12/2011 | Liu |
| 8,095,443 B2 | 1/2012 | DeBie |
| 8,095,458 B2 | 1/2012 | Peterson et al. |
| 8,099,309 B1 | 1/2012 | Bober |
| 8,099,341 B2 | 1/2012 | Varghese |
| 8,099,356 B2 | 1/2012 | Feinstein et al. |
| 8,099,376 B2 | 1/2012 | Serrano-Morales et al. |
| 8,104,679 B2 | 1/2012 | Brown |
| 8,108,301 B2 | 1/2012 | Gupta et al. |
| 8,127,982 B1 | 3/2012 | Casey et al. |
| 8,127,986 B1 | 3/2012 | Taylor et al. |
| 8,131,685 B1 | 3/2012 | Gedalius et al. |
| 8,131,777 B2 | 3/2012 | McCullough |
| 8,160,960 B1 | 4/2012 | Fei et al. |
| 8,175,889 B1 | 5/2012 | Girulat et al. |
| 8,195,549 B2 | 6/2012 | Kasower |
| 8,201,257 B1 | 6/2012 | Andres et al. |
| 8,204,812 B2 | 6/2012 | Stewart et al. |
| 8,224,723 B2 | 7/2012 | Bosch et al. |
| 8,225,395 B2 | 7/2012 | Atwood et al. |
| 8,234,498 B2 | 7/2012 | Britti et al. |
| 8,244,848 B1 | 8/2012 | Narayanan et al. |
| 8,249,968 B1 | 8/2012 | Oldham et al. |
| 8,271,393 B2 | 9/2012 | Twining et al. |
| 8,281,372 B1 * | 10/2012 | Vidal ................ 726/5 |
| 8,285,613 B1 | 10/2012 | Coulter |
| 8,285,656 B1 | 10/2012 | Chang et al. |
| 8,290,840 B2 | 10/2012 | Kasower |
| 8,290,856 B1 | 10/2012 | Kasower |
| 8,291,218 B2 | 10/2012 | Garcia et al. |
| 8,296,229 B1 | 10/2012 | Yellin et al. |
| 8,312,033 B1 | 11/2012 | McMillan |

(56) References Cited

U.S. PATENT DOCUMENTS

| | | | |
|---|---|---|---|
| 8,321,339 | B2 | 11/2012 | Imrey et al. |
| 8,327,429 | B2 | 12/2012 | Speyer et al. |
| 8,355,967 | B2 | 1/2013 | Debie et al. |
| 8,374,973 | B2 | 2/2013 | Herbrich et al. |
| 8,412,593 | B1 | 4/2013 | Song et al. |
| 8,433,654 | B2 | 4/2013 | Subbarao et al. |
| 8,442,886 | B1 | 5/2013 | Haggerty et al. |
| 8,447,016 | B1 | 5/2013 | Kugler et al. |
| 8,456,293 | B1 | 6/2013 | Trundle et al. |
| 8,458,062 | B2 | 6/2013 | Dutt et al. |
| 8,464,939 | B1 | 6/2013 | Taylor et al. |
| 8,473,318 | B2 | 6/2013 | Nielson et al. |
| 8,478,674 | B1 | 7/2013 | Kapczynski et al. |
| 8,484,186 | B1 | 7/2013 | Kapczynski et al. |
| 8,499,348 | B1 * | 7/2013 | Rubin ............................ 726/22 |
| 8,515,828 | B1 | 8/2013 | Wolf et al. |
| 8,515,844 | B2 | 8/2013 | Kasower |
| 8,527,357 | B1 | 9/2013 | Ganesan |
| 8,527,417 | B2 | 9/2013 | Telle et al. |
| 8,527,773 | B1 | 9/2013 | Metzger |
| 8,533,118 | B2 | 9/2013 | Weller et al. |
| 8,560,436 | B2 | 10/2013 | Ingram et al. |
| 8,560,447 | B1 | 10/2013 | Hinghole et al. |
| 8,572,083 | B1 | 10/2013 | Snell et al. |
| 8,578,036 | B1 | 11/2013 | Holfelder et al. |
| 8,578,496 | B1 | 11/2013 | Krishnappa |
| 8,600,886 | B2 | 12/2013 | Ramavarjula et al. |
| 8,601,602 | B1 | 12/2013 | Zheng |
| 8,606,234 | B2 | 12/2013 | Pei et al. |
| 8,606,694 | B2 | 12/2013 | Campbell et al. |
| 8,630,938 | B2 | 1/2014 | Cheng et al. |
| 8,646,051 | B2 | 2/2014 | Paden et al. |
| 8,705,718 | B2 | 4/2014 | Baniak et al. |
| 8,706,599 | B1 | 4/2014 | Koenig et al. |
| 8,725,613 | B1 | 5/2014 | Celka et al. |
| 8,738,516 | B1 | 5/2014 | Dean et al. |
| 8,744,956 | B1 | 6/2014 | DiChiara et al. |
| 8,745,698 | B1 * | 6/2014 | Ashfield et al. ................... 726/4 |
| 8,751,378 | B2 | 6/2014 | Dornhelm et al. |
| 8,768,914 | B2 | 7/2014 | Scriffignano et al. |
| 8,781,953 | B2 | 7/2014 | Kasower |
| 8,782,217 | B1 | 7/2014 | Arone et al. |
| 8,818,888 | B1 | 8/2014 | Kapczynski et al. |
| 8,856,894 | B1 | 10/2014 | Dean et al. |
| 8,930,251 | B2 | 1/2015 | DeBie |
| 8,930,263 | B1 | 1/2015 | Mahacek et al. |
| 8,931,058 | B2 | 1/2015 | DiChiara et al. |
| 8,938,399 | B1 | 1/2015 | Herman |
| 8,949,981 | B1 | 2/2015 | Trollope et al. |
| 8,954,459 | B1 | 2/2015 | McMillan et al. |
| 8,972,400 | B1 | 3/2015 | Kapczynski et al. |
| 9,058,627 | B1 | 6/2015 | Wasser et al. |
| 9,106,691 | B1 | 8/2015 | Burger et al. |
| 9,147,042 | B1 | 9/2015 | Haller et al. |
| 9,225,704 | B1 * | 12/2015 | Johansson et al. |
| 9,230,283 | B1 | 1/2016 | Taylor et al. |
| 9,256,904 | B1 | 2/2016 | Haller et al. |
| 9,400,589 | B1 | 7/2016 | Wasser et al. |
| 9,406,085 | B1 | 8/2016 | Hunt, III et al. |
| 2001/0001877 | A1 | 5/2001 | French et al. |
| 2001/0011245 | A1 | 8/2001 | Duhon |
| 2001/0029470 | A1 | 10/2001 | Schultz et al. |
| 2001/0029482 | A1 | 10/2001 | Tealdi et al. |
| 2001/0032181 | A1 | 10/2001 | Jakstadt et al. |
| 2001/0037204 | A1 | 11/2001 | Horn et al. |
| 2001/0037289 | A1 | 11/2001 | Mayr et al. |
| 2001/0039532 | A1 | 11/2001 | Coleman, Jr. et al. |
| 2001/0039563 | A1 | 11/2001 | Tian |
| 2001/0042785 | A1 | 11/2001 | Walker et al. |
| 2001/0044729 | A1 | 11/2001 | Pomerance |
| 2001/0044756 | A1 | 11/2001 | Watkins et al. |
| 2001/0047332 | A1 | 11/2001 | Gonen-Friedman et al. |
| 2001/0049274 | A1 | 12/2001 | Degraeve |
| 2002/0004736 | A1 | 1/2002 | Roundtree et al. |
| 2002/0010616 | A1 | 1/2002 | Itzaki |
| 2002/0013827 | A1 | 1/2002 | Edstrom et al. |
| 2002/0013899 | A1 | 1/2002 | Faul |
| 2002/0026394 | A1 | 2/2002 | Savage et al. |
| 2002/0026519 | A1 | 2/2002 | Itabashi et al. |
| 2002/0029192 | A1 | 3/2002 | Nakagawa et al. |
| 2002/0032635 | A1 | 3/2002 | Harris et al. |
| 2002/0033846 | A1 | 3/2002 | Balasubramanian et al. |
| 2002/0035480 | A1 | 3/2002 | Gordon et al. |
| 2002/0035684 | A1 | 3/2002 | Vogel et al. |
| 2002/0045154 | A1 | 4/2002 | Wood et al. |
| 2002/0052841 | A1 | 5/2002 | Guthrie et al. |
| 2002/0055906 | A1 | 5/2002 | Katz et al. |
| 2002/0059139 | A1 | 5/2002 | Evans |
| 2002/0059201 | A1 | 5/2002 | Work |
| 2002/0069122 | A1 | 6/2002 | Yun et al. |
| 2002/0069182 | A1 | 6/2002 | Dwyer |
| 2002/0077964 | A1 | 6/2002 | Brody et al. |
| 2002/0087460 | A1 | 7/2002 | Hornung |
| 2002/0099635 | A1 | 7/2002 | Guiragosian |
| 2002/0103933 | A1 | 8/2002 | Garon et al. |
| 2002/0111816 | A1 | 8/2002 | Lortscher et al. |
| 2002/0111890 | A1 | 8/2002 | Sloan et al. |
| 2002/0120757 | A1 | 8/2002 | Sutherland et al. |
| 2002/0120846 | A1 | 8/2002 | Stewart et al. |
| 2002/0128962 | A1 | 9/2002 | Kasower |
| 2002/0133365 | A1 | 9/2002 | Grey et al. |
| 2002/0133462 | A1 | 9/2002 | Shteyn |
| 2002/0138409 | A1 | 9/2002 | Bass |
| 2002/0138470 | A1 | 9/2002 | Zhou |
| 2002/0143943 | A1 | 10/2002 | Lee et al. |
| 2002/0147801 | A1 | 10/2002 | Gullotta et al. |
| 2002/0152166 | A1 | 10/2002 | Dutta et al. |
| 2002/0156676 | A1 | 10/2002 | Ahrens et al. |
| 2002/0157029 | A1 | 10/2002 | French et al. |
| 2002/0161664 | A1 | 10/2002 | Shaya et al. |
| 2002/0169747 | A1 | 11/2002 | Chapman et al. |
| 2002/0173994 | A1 | 11/2002 | Ferguson, III |
| 2002/0194120 | A1 | 12/2002 | Russell et al. |
| 2002/0198800 | A1 | 12/2002 | Shamrakov |
| 2002/0198806 | A1 | 12/2002 | Blagg et al. |
| 2002/0198824 | A1 | 12/2002 | Cook |
| 2002/0198830 | A1 | 12/2002 | Randell et al. |
| 2003/0002671 | A1 | 1/2003 | Inchalik et al. |
| 2003/0007283 | A1 | 1/2003 | Ostwald et al. |
| 2003/0009415 | A1 | 1/2003 | Lutnick et al. |
| 2003/0009418 | A1 | 1/2003 | Green et al. |
| 2003/0009426 | A1 | 1/2003 | Ruiz-Sanchez |
| 2003/0018578 | A1 | 1/2003 | Schultz |
| 2003/0023531 | A1 | 1/2003 | Fergusson |
| 2003/0028466 | A1 | 2/2003 | Jenson et al. |
| 2003/0028477 | A1 | 2/2003 | Stevenson et al. |
| 2003/0046311 | A1 | 3/2003 | Baidya et al. |
| 2003/0050929 | A1 | 3/2003 | Bookman et al. |
| 2003/0061104 | A1 | 3/2003 | Thomson et al. |
| 2003/0061163 | A1 | 3/2003 | Durfield |
| 2003/0069839 | A1 | 4/2003 | Whittington et al. |
| 2003/0069943 | A1 | 4/2003 | Bahrs et al. |
| 2003/0093311 | A1 | 5/2003 | Knowlson |
| 2003/0097342 | A1 | 5/2003 | Whittingtom |
| 2003/0097380 | A1 | 5/2003 | Mulhern et al. |
| 2003/0105646 | A1 | 6/2003 | Siepser |
| 2003/0105710 | A1 | 6/2003 | Barbara et al. |
| 2003/0105733 | A1 | 6/2003 | Boreham |
| 2003/0105742 | A1 | 6/2003 | Boreham et al. |
| 2003/0115133 | A1 | 6/2003 | Bian |
| 2003/0158960 | A1 | 8/2003 | Engberg |
| 2003/0163435 | A1 | 8/2003 | Payone |
| 2003/0163513 | A1 | 8/2003 | Schaeck et al. |
| 2003/0163733 | A1 | 8/2003 | Barriga-Caceres et al. |
| 2003/0171942 | A1 | 9/2003 | Gaito |
| 2003/0177028 | A1 | 9/2003 | Cooper et al. |
| 2003/0182214 | A1 | 9/2003 | Taylor |
| 2003/0187768 | A1 | 10/2003 | Ryan et al. |
| 2003/0187837 | A1 | 10/2003 | Culliss |
| 2003/0195859 | A1 | 10/2003 | Lawrence |
| 2003/0204429 | A1 | 10/2003 | Botscheck et al. |
| 2003/0204752 | A1 | 10/2003 | Garrison |
| 2003/0208412 | A1 | 11/2003 | Hillestad et al. |
| 2003/0220858 | A1 | 11/2003 | Lam et al. |

(56) References Cited

U.S. PATENT DOCUMENTS

| | | |
|---|---|---|
| 2003/0225742 A1 | 12/2003 | Tenner et al. |
| 2003/0229580 A1 | 12/2003 | Gass et al. |
| 2004/0001565 A1 | 1/2004 | Jones et al. |
| 2004/0006488 A1 | 1/2004 | Fitall et al. |
| 2004/0006536 A1 | 1/2004 | Kawashima et al. |
| 2004/0010458 A1 | 1/2004 | Friedman |
| 2004/0015714 A1 | 1/2004 | Abraham et al. |
| 2004/0015715 A1 | 1/2004 | Brown |
| 2004/0019518 A1 | 1/2004 | Abraham et al. |
| 2004/0019549 A1 | 1/2004 | Gulbrandsen |
| 2004/0019799 A1 | 1/2004 | Vering et al. |
| 2004/0024671 A1 | 2/2004 | Freund |
| 2004/0024709 A1 | 2/2004 | Yu et al. |
| 2004/0030574 A1 | 2/2004 | DiCostanzo et al. |
| 2004/0030649 A1 | 2/2004 | Nelson et al. |
| 2004/0039586 A1 | 2/2004 | Garvey et al. |
| 2004/0044563 A1 | 3/2004 | Stein |
| 2004/0044601 A1 | 3/2004 | Kim et al. |
| 2004/0044628 A1 | 3/2004 | Mathew et al. |
| 2004/0044673 A1 | 3/2004 | Brady et al. |
| 2004/0044739 A1 | 3/2004 | Ziegler |
| 2004/0046033 A1 | 3/2004 | Kolodziej et al. |
| 2004/0062213 A1 | 4/2004 | Koss |
| 2004/0078324 A1 | 4/2004 | Lonnberg et al. |
| 2004/0083159 A1 | 4/2004 | Crosby et al. |
| 2004/0088237 A1 | 5/2004 | Moenickheim et al. |
| 2004/0088255 A1 | 5/2004 | Zielke et al. |
| 2004/0093278 A1 | 5/2004 | Burchetta et al. |
| 2004/0102197 A1 | 5/2004 | Dietz |
| 2004/0107250 A1 | 6/2004 | Marciano |
| 2004/0110119 A1 | 6/2004 | Riconda et al. |
| 2004/0111359 A1 | 6/2004 | Hudock |
| 2004/0117302 A1 | 6/2004 | Weichert et al. |
| 2004/0122681 A1 | 6/2004 | Ruvolo et al. |
| 2004/0122696 A1 | 6/2004 | Beringer |
| 2004/0122697 A1 | 6/2004 | Becerra et al. |
| 2004/0123162 A1 | 6/2004 | Antell et al. |
| 2004/0128150 A1 | 7/2004 | Lundegren |
| 2004/0128156 A1 | 7/2004 | Beringer et al. |
| 2004/0128215 A1 | 7/2004 | Florance et al. |
| 2004/0133440 A1 | 7/2004 | Carolan et al. |
| 2004/0133509 A1 | 7/2004 | McCoy et al. |
| 2004/0133513 A1 | 7/2004 | McCoy et al. |
| 2004/0133514 A1 | 7/2004 | Zielke et al. |
| 2004/0133515 A1 | 7/2004 | McCoy et al. |
| 2004/0138992 A1 | 7/2004 | DeFrancesco et al. |
| 2004/0138994 A1 | 7/2004 | DeFrancesco et al. |
| 2004/0138997 A1 | 7/2004 | DeFrancesco et al. |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0153521 A1 | 8/2004 | Kogo |
| 2004/0158523 A1 | 8/2004 | Dort |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0177035 A1 | 9/2004 | Silva |
| 2004/0186807 A1 | 9/2004 | Nathans et al. |
| 2004/0193538 A1 | 9/2004 | Raines |
| 2004/0193891 A1 | 9/2004 | Ollila |
| 2004/0199789 A1 | 10/2004 | Shaw et al. |
| 2004/0210661 A1 | 10/2004 | Thompson |
| 2004/0215673 A1* | 10/2004 | Furukawa et al. ............ 707/204 |
| 2004/0220865 A1 | 11/2004 | Lozowski et al. |
| 2004/0220918 A1 | 11/2004 | Scriffignano et al. |
| 2004/0225545 A1 | 11/2004 | Turner et al. |
| 2004/0225609 A1 | 11/2004 | Greene |
| 2004/0225643 A1 | 11/2004 | Alpha et al. |
| 2004/0230527 A1 | 11/2004 | Hansen et al. |
| 2004/0236688 A1 | 11/2004 | Bozeman |
| 2004/0243508 A1 | 12/2004 | Samson et al. |
| 2004/0243518 A1 | 12/2004 | Clifton et al. |
| 2004/0243588 A1 | 12/2004 | Tanner et al. |
| 2004/0243832 A1 | 12/2004 | Wilf et al. |
| 2004/0249811 A1 | 12/2004 | Shostack et al. |
| 2004/0250107 A1 | 12/2004 | Guo |
| 2004/0254935 A1 | 12/2004 | Chagoly et al. |
| 2004/0255127 A1 | 12/2004 | Arnouse |
| 2004/0267714 A1 | 12/2004 | Frid et al. |
| 2005/0005168 A1 | 1/2005 | Dick |
| 2005/0010513 A1 | 1/2005 | Duckworth et al. |
| 2005/0015273 A1 | 1/2005 | Iyer |
| 2005/0021476 A1 | 1/2005 | Candella et al. |
| 2005/0021551 A1 | 1/2005 | Silva et al. |
| 2005/0027632 A1 | 2/2005 | Zeitoun et al. |
| 2005/0027666 A1 | 2/2005 | Beck |
| 2005/0027983 A1 | 2/2005 | Klawon |
| 2005/0027995 A1 | 2/2005 | Menschik et al. |
| 2005/0050027 A1 | 3/2005 | Yeh et al. |
| 2005/0055231 A1 | 3/2005 | Lee |
| 2005/0055296 A1 | 3/2005 | Hattersley et al. |
| 2005/0058262 A1 | 3/2005 | Timmins et al. |
| 2005/0060332 A1 | 3/2005 | Bernstein et al. |
| 2005/0071328 A1 | 3/2005 | Lawrence |
| 2005/0080723 A1 | 4/2005 | Burchetta et al. |
| 2005/0080796 A1 | 4/2005 | Midgley |
| 2005/0086126 A1 | 4/2005 | Patterson |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0105719 A1 | 5/2005 | Huda |
| 2005/0108396 A1 | 5/2005 | Bittner |
| 2005/0108631 A1 | 5/2005 | Amorin et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0125291 A1 | 6/2005 | Demkiw Grayson et al. |
| 2005/0125397 A1 | 6/2005 | Gross et al. |
| 2005/0125686 A1 | 6/2005 | Brandt |
| 2005/0137899 A1 | 6/2005 | Davies et al. |
| 2005/0144452 A1 | 6/2005 | Lynch et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0160280 A1* | 7/2005 | Caslin et al. ............ 713/189 |
| 2005/0166262 A1 | 7/2005 | Beattie et al. |
| 2005/0171884 A1 | 8/2005 | Arnott |
| 2005/0203768 A1 | 9/2005 | Florance |
| 2005/0208461 A1 | 9/2005 | Krebs et al. |
| 2005/0216434 A1 | 9/2005 | Haveliwala et al. |
| 2005/0216524 A1 | 9/2005 | Gomes et al. |
| 2005/0216582 A1 | 9/2005 | Toomey et al. |
| 2005/0216955 A1 | 9/2005 | Wilkins et al. |
| 2005/0226224 A1 | 10/2005 | Lee et al. |
| 2005/0240578 A1 | 10/2005 | Biederman et al. |
| 2005/0251474 A1 | 11/2005 | Shinn et al. |
| 2005/0256809 A1 | 11/2005 | Sadri |
| 2005/0267840 A1 | 12/2005 | Holm-Blagg et al. |
| 2005/0273431 A1 | 12/2005 | Abel et al. |
| 2005/0273442 A1 | 12/2005 | Bennett et al. |
| 2005/0288998 A1 | 12/2005 | Verma et al. |
| 2006/0004623 A1 | 1/2006 | Jasti |
| 2006/0004626 A1 | 1/2006 | Holmen et al. |
| 2006/0010391 A1 | 1/2006 | Uemura et al. |
| 2006/0010487 A1 | 1/2006 | Fierer et al. |
| 2006/0031158 A1 | 2/2006 | Orman |
| 2006/0031177 A1 | 2/2006 | Rule |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0036870 A1 | 2/2006 | Dasari et al. |
| 2006/0041464 A1 | 2/2006 | Powers et al. |
| 2006/0041670 A1 | 2/2006 | Musseleck et al. |
| 2006/0059110 A1 | 3/2006 | Madhok et al. |
| 2006/0059362 A1 | 3/2006 | Paden et al. |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080230 A1 | 4/2006 | Freiberg |
| 2006/0080251 A1 | 4/2006 | Fried et al. |
| 2006/0080263 A1 | 4/2006 | Willis et al. |
| 2006/0085334 A1 | 4/2006 | Murphy |

(56) References Cited

U.S. PATENT DOCUMENTS

| | | |
|---|---|---|
| 2006/0085361 A1 | 4/2006 | Hoerle et al. |
| 2006/0095289 A1 | 5/2006 | Bunning |
| 2006/0101508 A1 | 5/2006 | Taylor |
| 2006/0106670 A1 | 5/2006 | Cai et al. |
| 2006/0129419 A1 | 6/2006 | Flaxer et al. |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136595 A1 | 6/2006 | Satyavolu |
| 2006/0155573 A1 | 7/2006 | Hartunian |
| 2006/0155780 A1 | 7/2006 | Sakairi et al. |
| 2006/0161435 A1 | 7/2006 | Atef et al. |
| 2006/0161554 A1 | 7/2006 | Lucovsky et al. |
| 2006/0173776 A1 | 8/2006 | Shalley et al. |
| 2006/0173792 A1 | 8/2006 | Glass |
| 2006/0178971 A1 | 8/2006 | Owen et al. |
| 2006/0179050 A1 | 8/2006 | Giang et al. |
| 2006/0184585 A1 | 8/2006 | Grear et al. |
| 2006/0190394 A1 | 8/2006 | Fraser et al. |
| 2006/0195351 A1 | 8/2006 | Bayburtian |
| 2006/0200583 A1 | 9/2006 | Le Lann et al. |
| 2006/0202012 A1 | 9/2006 | Grano et al. |
| 2006/0204051 A1 | 9/2006 | Holland, IV |
| 2006/0212407 A1 | 9/2006 | Lyon |
| 2006/0212486 A1* | 9/2006 | Kennis et al. ................ 707/200 |
| 2006/0218407 A1 | 9/2006 | Toms |
| 2006/0223043 A1 | 10/2006 | Dancy-Edwards et al. |
| 2006/0229943 A1 | 10/2006 | Mathias et al. |
| 2006/0229961 A1 | 10/2006 | Lyftogt et al. |
| 2006/0235935 A1 | 10/2006 | Ng |
| 2006/0239512 A1 | 10/2006 | Petrillo |
| 2006/0253358 A1 | 11/2006 | Delgrosso et al. |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0277089 A1 | 12/2006 | Hubbard et al. |
| 2006/0277102 A1 | 12/2006 | Agliozzo |
| 2006/0282359 A1 | 12/2006 | Nobili et al. |
| 2006/0282373 A1 | 12/2006 | Stone |
| 2006/0282374 A1 | 12/2006 | Stone |
| 2006/0282429 A1 | 12/2006 | Hernandez-Sherrington et al. |
| 2006/0282819 A1 | 12/2006 | Graham et al. |
| 2006/0282886 A1* | 12/2006 | Gaug ................................ 726/5 |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0293987 A1 | 12/2006 | Shapiro |
| 2006/0294199 A1 | 12/2006 | Bertholf |
| 2007/0005508 A1 | 1/2007 | Chiang |
| 2007/0005984 A1* | 1/2007 | Florencio et al. ............ 713/178 |
| 2007/0016500 A1 | 1/2007 | Chatterji et al. |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038568 A1 | 2/2007 | Greene et al. |
| 2007/0039049 A1* | 2/2007 | Kupferman et al. ........... 726/22 |
| 2007/0040015 A1 | 2/2007 | Carlson et al. |
| 2007/0043577 A1 | 2/2007 | Kasower |
| 2007/0047714 A1 | 3/2007 | Baniak et al. |
| 2007/0050777 A1* | 3/2007 | Hutchinson et al. ......... 718/104 |
| 2007/0055621 A1 | 3/2007 | Tischler et al. |
| 2007/0067297 A1 | 3/2007 | Kublickis |
| 2007/0072190 A1 | 3/2007 | Aggarwal |
| 2007/0073577 A1 | 3/2007 | Krause |
| 2007/0073889 A1 | 3/2007 | Morris |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0083463 A1 | 4/2007 | Kraft |
| 2007/0093234 A1 | 4/2007 | Willis et al. |
| 2007/0094230 A1 | 4/2007 | Subramaniam et al. |
| 2007/0094241 A1 | 4/2007 | Blackwell et al. |
| 2007/0112667 A1 | 5/2007 | Rucker |
| 2007/0112668 A1 | 5/2007 | Celano et al. |
| 2007/0112670 A1 | 5/2007 | DeFrancesco et al. |
| 2007/0121843 A1 | 5/2007 | Atazky et al. |
| 2007/0124235 A1 | 5/2007 | Chakraborty et al. |
| 2007/0124256 A1 | 5/2007 | Crooks et al. |
| 2007/0136109 A1 | 6/2007 | Yager et al. |
| 2007/0143123 A1 | 6/2007 | Goldberg et al. |
| 2007/0149184 A1* | 6/2007 | Viegers et al. ............ 455/422.1 |
| 2007/0156554 A1 | 7/2007 | Nikoley et al. |
| 2007/0156581 A1 | 7/2007 | Imrey et al. |
| 2007/0156692 A1 | 7/2007 | Rosewarne |
| 2007/0160458 A1 | 7/2007 | Yen |
| 2007/0174186 A1 | 7/2007 | Hokland |
| 2007/0174448 A1 | 7/2007 | Ahuja et al. |
| 2007/0174903 A1 | 7/2007 | Greff |
| 2007/0198432 A1 | 8/2007 | Pitroda et al. |
| 2007/0204033 A1* | 8/2007 | Bookbinder et al. ......... 709/224 |
| 2007/0204338 A1 | 8/2007 | Aiello et al. |
| 2007/0205266 A1 | 9/2007 | Carr et al. |
| 2007/0208640 A1 | 9/2007 | Banasiak et al. |
| 2007/0220003 A1 | 9/2007 | Chern et al. |
| 2007/0226047 A1 | 9/2007 | Ward |
| 2007/0226122 A1 | 9/2007 | Burrell et al. |
| 2007/0233591 A1 | 10/2007 | Newton |
| 2007/0239493 A1 | 10/2007 | Sweetland et al. |
| 2007/0240206 A1 | 10/2007 | Wu et al. |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0250459 A1 | 10/2007 | Schwarz et al. |
| 2007/0261114 A1 | 11/2007 | Pomerantsev |
| 2007/0262140 A1 | 11/2007 | Long, Sr. |
| 2007/0266439 A1 | 11/2007 | Kraft |
| 2007/0273558 A1 | 11/2007 | Smith |
| 2007/0282743 A1 | 12/2007 | Lovelett |
| 2007/0287415 A1* | 12/2007 | Yamada ........................ 455/406 |
| 2007/0288355 A1 | 12/2007 | Roland et al. |
| 2007/0288360 A1 | 12/2007 | Seeklus |
| 2007/0294195 A1 | 12/2007 | Curry et al. |
| 2007/0299770 A1 | 12/2007 | Delinsky |
| 2008/0004957 A1 | 1/2008 | Hildreth et al. |
| 2008/0010203 A1 | 1/2008 | Grant |
| 2008/0010206 A1 | 1/2008 | Coleman |
| 2008/0010687 A1 | 1/2008 | Gonen et al. |
| 2008/0021802 A1 | 1/2008 | Pendleton |
| 2008/0027859 A1 | 1/2008 | Nathans et al. |
| 2008/0028446 A1 | 1/2008 | Burgoyne |
| 2008/0033742 A1 | 2/2008 | Bernasconi |
| 2008/0033956 A1 | 2/2008 | Saha et al. |
| 2008/0040176 A1 | 2/2008 | Ehling |
| 2008/0040610 A1 | 2/2008 | Fergusson |
| 2008/0047017 A1 | 2/2008 | Renaud |
| 2008/0052182 A1 | 2/2008 | Marshall |
| 2008/0052244 A1 | 2/2008 | Tsuei et al. |
| 2008/0059352 A1 | 3/2008 | Chandran |
| 2008/0059364 A1 | 3/2008 | Tidwell et al. |
| 2008/0065569 A1 | 3/2008 | Dutt et al. |
| 2008/0065774 A1 | 3/2008 | Keeler |
| 2008/0066188 A1 | 3/2008 | Kwak |
| 2008/0071682 A1 | 3/2008 | Dominguez |
| 2008/0072316 A1 | 3/2008 | Chang et al. |
| 2008/0077526 A1 | 3/2008 | Arumugam |
| 2008/0082536 A1 | 4/2008 | Schwabe et al. |
| 2008/0083021 A1 | 4/2008 | Doane et al. |
| 2008/0086400 A1 | 4/2008 | Ardelean et al. |
| 2008/0086431 A1 | 4/2008 | Robinson et al. |
| 2008/0086759 A1 | 4/2008 | Colson |
| 2008/0091519 A1 | 4/2008 | Foss |
| 2008/0091530 A1 | 4/2008 | Egnatios et al. |
| 2008/0097822 A1* | 4/2008 | Schigel et al. .................. 705/10 |
| 2008/0103800 A1 | 5/2008 | Domenikos et al. |
| 2008/0103972 A1 | 5/2008 | Lanc |
| 2008/0109422 A1 | 5/2008 | Dedhia |
| 2008/0109740 A1 | 5/2008 | Prinsen et al. |
| 2008/0109875 A1 | 5/2008 | Kraft |
| 2008/0110973 A1 | 5/2008 | Nathans et al. |
| 2008/0114670 A1 | 5/2008 | Friesen |

(56) References Cited

U.S. PATENT DOCUMENTS

| | | |
|---|---|---|
| 2008/0115191 A1 | 5/2008 | Kim et al. |
| 2008/0115226 A1 | 5/2008 | Welingkar et al. |
| 2008/0120155 A1 | 5/2008 | Pliha |
| 2008/0120204 A1 | 5/2008 | Conner et al. |
| 2008/0120569 A1 | 5/2008 | Mann et al. |
| 2008/0120716 A1 | 5/2008 | Hall et al. |
| 2008/0126233 A1 | 5/2008 | Hogan |
| 2008/0133273 A1 | 6/2008 | Marshall |
| 2008/0133278 A1 | 6/2008 | Stanfield |
| 2008/0140476 A1 | 6/2008 | Anand et al. |
| 2008/0140576 A1 | 6/2008 | Lewis et al. |
| 2008/0140734 A1 | 6/2008 | Wagner |
| 2008/0141346 A1 | 6/2008 | Kay et al. |
| 2008/0148368 A1 | 6/2008 | Zurko et al. |
| 2008/0154758 A1 | 6/2008 | Schattmaier et al. |
| 2008/0154766 A1 | 6/2008 | Lewis et al. |
| 2008/0162317 A1 | 7/2008 | Banaugh et al. |
| 2008/0162350 A1 | 7/2008 | Allen-Rouman et al. |
| 2008/0162383 A1 | 7/2008 | Kraft |
| 2008/0175360 A1 | 7/2008 | Schwarz et al. |
| 2008/0177655 A1 | 7/2008 | Zalik |
| 2008/0183480 A1 | 7/2008 | Carlson et al. |
| 2008/0183585 A1 | 7/2008 | Vianello |
| 2008/0195548 A1 | 8/2008 | Chu et al. |
| 2008/0201257 A1 | 8/2008 | Lewis et al. |
| 2008/0201401 A1 | 8/2008 | Pugh et al. |
| 2008/0205655 A1 | 8/2008 | Wilkins et al. |
| 2008/0208548 A1 | 8/2008 | Metzger et al. |
| 2008/0208735 A1 | 8/2008 | Balet et al. |
| 2008/0208873 A1 | 8/2008 | Boehmer |
| 2008/0212845 A1 | 9/2008 | Lund |
| 2008/0221972 A1 | 9/2008 | Megdal et al. |
| 2008/0222027 A1 | 9/2008 | Megdal et al. |
| 2008/0222706 A1 | 9/2008 | Renaud et al. |
| 2008/0228556 A1 | 9/2008 | Megdal et al. |
| 2008/0228775 A1 | 9/2008 | Abhyanker et al. |
| 2008/0229415 A1 | 9/2008 | Kapoor et al. |
| 2008/0249869 A1 | 10/2008 | Angell et al. |
| 2008/0255992 A1 | 10/2008 | Lin |
| 2008/0263058 A1 | 10/2008 | Peden |
| 2008/0263638 A1 | 10/2008 | McMurtry et al. |
| 2008/0270038 A1 | 10/2008 | Partovi et al. |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0277465 A1 | 11/2008 | Pletz et al. |
| 2008/0281737 A1 | 11/2008 | Fajardo |
| 2008/0282324 A1 | 11/2008 | Hoal |
| 2008/0288283 A1 | 11/2008 | Baldwin, Jr. et al. |
| 2008/0288299 A1 | 11/2008 | Schultz |
| 2008/0294501 A1 | 11/2008 | Rennich et al. |
| 2008/0301016 A1 | 12/2008 | Durvasula et al. |
| 2008/0306750 A1 | 12/2008 | Wunder et al. |
| 2008/0319889 A1 | 12/2008 | Hammad |
| 2009/0006230 A1 | 1/2009 | Lyda et al. |
| 2009/0024484 A1 | 1/2009 | Walker et al. |
| 2009/0030776 A1 | 1/2009 | Walker et al. |
| 2009/0031426 A1 | 1/2009 | Dal Lago et al. |
| 2009/0037279 A1 | 2/2009 | Chockalingam et al. |
| 2009/0037332 A1 | 2/2009 | Cheung et al. |
| 2009/0043691 A1 | 2/2009 | Kasower |
| 2009/0048957 A1 | 2/2009 | Celano |
| 2009/0048999 A1 | 2/2009 | Gupta et al. |
| 2009/0055322 A1 | 2/2009 | Bykov et al. |
| 2009/0055404 A1 | 2/2009 | Heiden et al. |
| 2009/0055894 A1 | 2/2009 | Lorsch |
| 2009/0064297 A1 | 3/2009 | Selgas et al. |
| 2009/0089190 A1 | 4/2009 | Girulat |
| 2009/0089193 A1 | 4/2009 | Paintin |
| 2009/0089869 A1 | 4/2009 | Varghese |
| 2009/0094237 A1 | 4/2009 | Churi et al. |
| 2009/0094674 A1 | 4/2009 | Schwartz et al. |
| 2009/0094675 A1 | 4/2009 | Powers |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0126013 A1 | 5/2009 | Atwood et al. |
| 2009/0132347 A1 | 5/2009 | Anderson et al. |
| 2009/0138335 A1 | 5/2009 | Lieberman |
| 2009/0144166 A1 | 6/2009 | Dickelman |
| 2009/0150166 A1 | 6/2009 | Leite et al. |
| 2009/0150238 A1 | 6/2009 | Marsh et al. |
| 2009/0157564 A1 | 6/2009 | Cross |
| 2009/0157693 A1 | 6/2009 | Palahnuk |
| 2009/0158030 A1 | 6/2009 | Rasti |
| 2009/0164232 A1 | 6/2009 | Chmielewski et al. |
| 2009/0164380 A1 | 6/2009 | Brown |
| 2009/0164929 A1 | 6/2009 | Chen et al. |
| 2009/0171723 A1 | 7/2009 | Jenkins |
| 2009/0172788 A1 | 7/2009 | Vedula et al. |
| 2009/0172795 A1 | 7/2009 | Ritari et al. |
| 2009/0177529 A1 | 7/2009 | Hadi |
| 2009/0177562 A1 | 7/2009 | Peace et al. |
| 2009/0177670 A1 | 7/2009 | Grenier et al. |
| 2009/0183259 A1 | 7/2009 | Rinek et al. |
| 2009/0187607 A1 | 7/2009 | Yoo et al. |
| 2009/0198557 A1 | 8/2009 | Wang et al. |
| 2009/0198602 A1 | 8/2009 | Wang et al. |
| 2009/0199264 A1 | 8/2009 | Lang |
| 2009/0199294 A1 | 8/2009 | Schneider |
| 2009/0204514 A1 | 8/2009 | Bhogal et al. |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0216640 A1 | 8/2009 | Masi |
| 2009/0217342 A1 | 8/2009 | Nadler |
| 2009/0222527 A1* | 9/2009 | Arconati et al. ............... 709/206 |
| 2009/0228918 A1 | 9/2009 | Rolff et al. |
| 2009/0234665 A1 | 9/2009 | Conkel |
| 2009/0234775 A1 | 9/2009 | Whitney et al. |
| 2009/0234876 A1 | 9/2009 | Schigel et al. |
| 2009/0240624 A1 | 9/2009 | James et al. |
| 2009/0247122 A1 | 10/2009 | Fitzgerald et al. |
| 2009/0248573 A1 | 10/2009 | Haggerty et al. |
| 2009/0249451 A1 | 10/2009 | Su et al. |
| 2009/0254375 A1 | 10/2009 | Martinez et al. |
| 2009/0254476 A1 | 10/2009 | Sharma et al. |
| 2009/0254656 A1 | 10/2009 | Vignisson et al. |
| 2009/0254971 A1 | 10/2009 | Herz et al. |
| 2009/0260064 A1 | 10/2009 | Mcdowell et al. |
| 2009/0271265 A1 | 10/2009 | Lay et al. |
| 2009/0276368 A1 | 11/2009 | Martin et al. |
| 2009/0280467 A1 | 11/2009 | Ahart |
| 2009/0281816 A1* | 11/2009 | Houga et al. ..................... 705/1 |
| 2009/0289110 A1 | 11/2009 | Regen et al. |
| 2009/0300066 A1 | 12/2009 | Guo et al. |
| 2009/0300604 A1 | 12/2009 | Barringer |
| 2009/0300641 A1 | 12/2009 | Friedman et al. |
| 2009/0307778 A1 | 12/2009 | Mardikar |
| 2009/0313562 A1 | 12/2009 | Appleyard et al. |
| 2009/0319648 A1 | 12/2009 | Dutta et al. |
| 2009/0327054 A1 | 12/2009 | Yao et al. |
| 2009/0327120 A1 | 12/2009 | Eze et al. |
| 2009/0327270 A1 | 12/2009 | Teevan et al. |
| 2009/0328173 A1 | 12/2009 | Jakobson et al. |
| 2010/0009320 A1 | 1/2010 | Wilkelis |
| 2010/0009332 A1 | 1/2010 | Yaskin et al. |
| 2010/0010935 A1 | 1/2010 | Shelton |
| 2010/0011428 A1 | 1/2010 | Atwood et al. |
| 2010/0023434 A1 | 1/2010 | Bond |
| 2010/0023440 A1 | 1/2010 | Fraser et al. |
| 2010/0023448 A1 | 1/2010 | Eze |
| 2010/0030578 A1 | 2/2010 | Siddique et al. |
| 2010/0030649 A1 | 2/2010 | Ubelhor |
| 2010/0030677 A1 | 2/2010 | Melik-Aslanian et al. |
| 2010/0036697 A1 | 2/2010 | Kelnar |
| 2010/0036769 A1 | 2/2010 | Winters et al. |
| 2010/0042542 A1 | 2/2010 | Rose et al. |
| 2010/0043055 A1 | 2/2010 | Baumgart |
| 2010/0049803 A1 | 2/2010 | Ogilvie et al. |

(56) References Cited

U.S. PATENT DOCUMENTS

| | | |
|---|---|---|
| 2010/0063942 A1 | 3/2010 | Arnott et al. |
| 2010/0063993 A1 | 3/2010 | Higgins et al. |
| 2010/0077483 A1* | 3/2010 | Stolfo et al. ............... 726/24 |
| 2010/0082476 A1 | 4/2010 | Bowman |
| 2010/0083371 A1 | 4/2010 | Bennetts et al. |
| 2010/0094768 A1 | 4/2010 | Miltonberger |
| 2010/0094774 A1 | 4/2010 | Jackowitz et al. |
| 2010/0094910 A1 | 4/2010 | Bayliss |
| 2010/0100945 A1 | 4/2010 | Ozzie et al. |
| 2010/0114724 A1 | 5/2010 | Ghosh et al. |
| 2010/0114744 A1 | 5/2010 | Gonen |
| 2010/0114747 A1 | 5/2010 | Kasower |
| 2010/0114776 A1 | 5/2010 | Weller et al. |
| 2010/0121767 A1 | 5/2010 | Coulter et al. |
| 2010/0122324 A1 | 5/2010 | Welingkar et al. |
| 2010/0122333 A1 | 5/2010 | Noe et al. |
| 2010/0130172 A1 | 5/2010 | Vendrow et al. |
| 2010/0136956 A1 | 6/2010 | Drachev et al. |
| 2010/0145836 A1 | 6/2010 | Baker et al. |
| 2010/0153278 A1 | 6/2010 | Farsedakis |
| 2010/0153290 A1 | 6/2010 | Duggan |
| 2010/0161816 A1 | 6/2010 | Kraft et al. |
| 2010/0169159 A1 | 7/2010 | Rose et al. |
| 2010/0174638 A1 | 7/2010 | Debie et al. |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0188684 A1 | 7/2010 | Kumara |
| 2010/0205076 A1 | 8/2010 | Parson et al. |
| 2010/0205662 A1 | 8/2010 | Ibrahim et al. |
| 2010/0211445 A1 | 8/2010 | Bodington |
| 2010/0211636 A1 | 8/2010 | Starkenburg et al. |
| 2010/0214090 A1* | 8/2010 | Sartini et al. ............... 340/517 |
| 2010/0217837 A1 | 8/2010 | Ansari et al. |
| 2010/0223160 A1 | 9/2010 | Brown |
| 2010/0223192 A1 | 9/2010 | Levine et al. |
| 2010/0228658 A1 | 9/2010 | Ketelsen et al. |
| 2010/0229245 A1 | 9/2010 | Singhal |
| 2010/0241535 A1 | 9/2010 | Nightengale et al. |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0257577 A1 | 10/2010 | Grandison et al. |
| 2010/0258623 A1 | 10/2010 | Beemer et al. |
| 2010/0262932 A1 | 10/2010 | Pan |
| 2010/0268557 A1 | 10/2010 | Faith et al. |
| 2010/0274815 A1 | 10/2010 | Vanasco |
| 2010/0280914 A1 | 11/2010 | Carlson |
| 2010/0281020 A1 | 11/2010 | Drubner |
| 2010/0293090 A1 | 11/2010 | Domenikos et al. |
| 2010/0299262 A1 | 11/2010 | Handler |
| 2010/0323446 A1 | 12/2010 | Barnett et al. |
| 2010/0325048 A1 | 12/2010 | Carlson et al. |
| 2010/0325694 A1 | 12/2010 | Bhagavatula et al. |
| 2010/0332393 A1 | 12/2010 | Weller et al. |
| 2011/0004498 A1 | 1/2011 | Readshaw |
| 2011/0016533 A1 | 1/2011 | Zeigler et al. |
| 2011/0023115 A1 | 1/2011 | Wright |
| 2011/0029388 A1 | 2/2011 | Kendall et al. |
| 2011/0035452 A1 | 2/2011 | Gittleman |
| 2011/0035788 A1 | 2/2011 | White et al. |
| 2011/0040629 A1 | 2/2011 | Chiu et al. |
| 2011/0066495 A1 | 3/2011 | Ayloo et al. |
| 2011/0066618 A1 | 3/2011 | Sigurbjornsson et al. |
| 2011/0071950 A1 | 3/2011 | Ivanovic |
| 2011/0078073 A1 | 3/2011 | Annappindi et al. |
| 2011/0083181 A1 | 4/2011 | Nazarov |
| 2011/0113084 A1 | 5/2011 | Ramnani |
| 2011/0113086 A1 | 5/2011 | Long et al. |
| 2011/0113096 A1 | 5/2011 | Long et al. |
| 2011/0125924 A1 | 5/2011 | McAleer |
| 2011/0126275 A1 | 5/2011 | Anderson et al. |
| 2011/0131123 A1 | 6/2011 | Griffin et al. |
| 2011/0137760 A1 | 6/2011 | Rudie et al. |
| 2011/0137765 A1 | 6/2011 | Nonaka |
| 2011/0142213 A1 | 6/2011 | Baniak et al. |
| 2011/0145899 A1 | 6/2011 | Cao et al. |
| 2011/0148625 A1 | 6/2011 | Velusamy |
| 2011/0161218 A1 | 6/2011 | Swift |
| 2011/0166988 A1 | 7/2011 | Coulter |
| 2011/0167011 A1 | 7/2011 | Paltenghe et al. |
| 2011/0178841 A1 | 7/2011 | Rane et al. |
| 2011/0179139 A1 | 7/2011 | Starkenburg et al. |
| 2011/0184780 A1 | 7/2011 | Alderson et al. |
| 2011/0184838 A1 | 7/2011 | Winters et al. |
| 2011/0196791 A1 | 8/2011 | Dominguez |
| 2011/0211445 A1 | 9/2011 | Chen |
| 2011/0214187 A1* | 9/2011 | Wittenstein et al. ............ 726/25 |
| 2011/0252071 A1* | 10/2011 | Cidon ........................ 707/802 |
| 2011/0264566 A1 | 10/2011 | Brown |
| 2011/0264581 A1 | 10/2011 | Clyne |
| 2011/0270618 A1 | 11/2011 | Banerjee et al. |
| 2011/0270754 A1 | 11/2011 | Kelly et al. |
| 2011/0276396 A1 | 11/2011 | Rathod |
| 2011/0296003 A1* | 12/2011 | McCann et al. ............... 709/224 |
| 2011/0302653 A1* | 12/2011 | Frantz et al. ................ 726/22 |
| 2011/0307397 A1 | 12/2011 | Benmbarek |
| 2011/0307434 A1 | 12/2011 | Rostampour et al. |
| 2011/0307957 A1 | 12/2011 | Barcelo et al. |
| 2011/0320582 A1* | 12/2011 | Lewis ........................ 709/224 |
| 2012/0005070 A1 | 1/2012 | McFall et al. |
| 2012/0005542 A1* | 1/2012 | Petersen et al. ............... 714/48 |
| 2012/0011158 A1 | 1/2012 | Avner et al. |
| 2012/0016948 A1 | 1/2012 | Sinha |
| 2012/0022990 A1 | 1/2012 | Kasower |
| 2012/0030216 A1 | 2/2012 | Churi et al. |
| 2012/0030771 A1 | 2/2012 | Pierson et al. |
| 2012/0047219 A1 | 2/2012 | Feng et al. |
| 2012/0054088 A1 | 3/2012 | Edrington et al. |
| 2012/0054592 A1 | 3/2012 | Jaffe et al. |
| 2012/0060105 A1 | 3/2012 | Brown et al. |
| 2012/0066106 A1 | 3/2012 | Papadimitriou |
| 2012/0072382 A1 | 3/2012 | Pearson et al. |
| 2012/0078932 A1 | 3/2012 | Skurtovich, Jr. et al. |
| 2012/0084866 A1* | 4/2012 | Stolfo ........................ 726/25 |
| 2012/0089438 A1 | 4/2012 | Tavares et al. |
| 2012/0101938 A1 | 4/2012 | Kasower |
| 2012/0101939 A1 | 4/2012 | Kasower |
| 2012/0108274 A1 | 5/2012 | Acebo Ruiz et al. |
| 2012/0110467 A1 | 5/2012 | Blake et al. |
| 2012/0110677 A1 | 5/2012 | Abendroth et al. |
| 2012/0124498 A1 | 5/2012 | Santoro et al. |
| 2012/0136763 A1 | 5/2012 | Megdal et al. |
| 2012/0136774 A1 | 5/2012 | Imrey et al. |
| 2012/0151045 A1 | 6/2012 | Anakata et al. |
| 2012/0151046 A1* | 6/2012 | Weiss et al. ................ 709/224 |
| 2012/0158654 A1 | 6/2012 | Behren et al. |
| 2012/0173339 A1 | 7/2012 | Flynt et al. |
| 2012/0173417 A1 | 7/2012 | Lohman et al. |
| 2012/0185515 A1 | 7/2012 | Ferrel et al. |
| 2012/0195412 A1* | 8/2012 | Smith ........................ 379/88.13 |
| 2012/0198556 A1 | 8/2012 | Patel et al. |
| 2012/0215682 A1 | 8/2012 | Lent et al. |
| 2012/0215719 A1 | 8/2012 | Verlander |
| 2012/0216125 A1 | 8/2012 | Pierce |
| 2012/0235897 A1 | 9/2012 | Hirota |
| 2012/0239497 A1 | 9/2012 | Nuzzi |
| 2012/0246060 A1 | 9/2012 | Conyack, Jr. et al. |
| 2012/0253852 A1 | 10/2012 | Pourfallah et al. |
| 2012/0278767 A1 | 11/2012 | Stibel et al. |
| 2012/0290660 A1 | 11/2012 | Rao et al. |
| 2012/0290740 A1* | 11/2012 | Tewari et al. ............... 709/248 |
| 2012/0297484 A1 | 11/2012 | Srivastava |
| 2012/0317014 A1 | 12/2012 | Cerise et al. |
| 2012/0324388 A1 | 12/2012 | Rao et al. |
| 2013/0006843 A1 | 1/2013 | Tralvex |
| 2013/0006844 A1* | 1/2013 | Kremen ........................ 705/38 |
| 2013/0018811 A1 | 1/2013 | Britti et al. |
| 2013/0031109 A1 | 1/2013 | Routson et al. |
| 2013/0031624 A1 | 1/2013 | Britti et al. |
| 2013/0066775 A1 | 3/2013 | Milam |

(56) References Cited

U.S. PATENT DOCUMENTS

| | | |
|---|---|---|
| 2013/0080467 A1 | 3/2013 | Carson et al. |
| 2013/0085804 A1 | 4/2013 | Leff et al. |
| 2013/0103571 A1 | 4/2013 | Chung et al. |
| 2013/0110557 A1 | 5/2013 | Kasower |
| 2013/0110565 A1 | 5/2013 | Means et al. |
| 2013/0110678 A1 | 5/2013 | Vigier et al. |
| 2013/0117072 A1 | 5/2013 | Nish |
| 2013/0117087 A1 | 5/2013 | Coppinger |
| 2013/0125010 A1 | 5/2013 | Strandell |
| 2013/0132151 A1 | 5/2013 | Stibel et al. |
| 2013/0159411 A1 | 6/2013 | Bowen |
| 2013/0173447 A1 | 7/2013 | Rothschild |
| 2013/0173449 A1 | 7/2013 | Ng et al. |
| 2013/0185293 A1 | 7/2013 | Boback |
| 2013/0205135 A1 | 8/2013 | Lutz |
| 2013/0211986 A1 | 8/2013 | Debie et al. |
| 2013/0246528 A1 | 9/2013 | Ogura |
| 2013/0262226 A1 | 10/2013 | LaChapelle et al. |
| 2013/0267171 A1 | 10/2013 | Sarkar et al. |
| 2013/0279676 A1 | 10/2013 | Baniak et al. |
| 2013/0293363 A1 | 11/2013 | Plymouth |
| 2013/0298238 A1 | 11/2013 | Shah et al. |
| 2013/0332341 A1 | 12/2013 | Papadimitriou |
| 2013/0332342 A1 | 12/2013 | Kasower |
| 2013/0339249 A1 | 12/2013 | Weller et al. |
| 2013/0347059 A1 | 12/2013 | Fong et al. |
| 2014/0012733 A1 | 1/2014 | Vidal |
| 2014/0012737 A1 | 1/2014 | Evans |
| 2014/0019348 A1 | 1/2014 | Daley |
| 2014/0032300 A1 | 1/2014 | Zhang et al. |
| 2014/0032723 A1 | 1/2014 | Nema |
| 2014/0046872 A1 | 2/2014 | Arnott et al. |
| 2014/0061302 A1 | 3/2014 | Hammad |
| 2014/0089166 A1 | 3/2014 | Padawer |
| 2014/0089167 A1 | 3/2014 | Kasower |
| 2014/0089191 A1 | 3/2014 | Brown |
| 2014/0096249 A1 | 4/2014 | Dupont et al. |
| 2014/0110477 A1 | 4/2014 | Hammad |
| 2014/0129942 A1 | 5/2014 | Rathod |
| 2014/0156500 A1 | 6/2014 | Lassen et al. |
| 2014/0156501 A1 | 6/2014 | Howe |
| 2014/0156503 A1 | 6/2014 | Lassen et al. |
| 2014/0164112 A1 | 6/2014 | Kala |
| 2014/0164398 A1 | 6/2014 | Smith et al. |
| 2014/0164519 A1 | 6/2014 | Shah |
| 2014/0180919 A1 | 6/2014 | Brown |
| 2014/0181285 A1 | 6/2014 | Stevens et al. |
| 2014/0258083 A1 | 9/2014 | Achanta et al. |
| 2014/0258084 A1 | 9/2014 | Padawer et al. |
| 2014/0279329 A1 | 9/2014 | Dancel |
| 2014/0298485 A1 | 10/2014 | Gardner |
| 2014/0317023 A1 | 10/2014 | Kim |
| 2014/0379554 A1 | 12/2014 | Grossman et al. |
| 2015/0178829 A1 | 6/2015 | Weiss |
| 2015/0310543 A1 | 10/2015 | Debie et al. |
| 2015/0324920 A1 | 11/2015 | Wilson et al. |
| 2015/0326580 A1 | 11/2015 | McMillan et al. |

FOREIGN PATENT DOCUMENTS

| | | |
|---|---|---|
| EP | 1 239 378 | 1/2002 |
| EP | 1 301 887 | 4/2003 |
| EP | 1 850 278 | 10/2007 |
| EP | 2 088 743 | 8/2009 |
| GB | 2 102 606 | 2/1983 |
| JP | 2005-208945 | 8/2005 |
| KR | 2000-0063313 | 11/2000 |
| KR | 2002-0039203 | 5/2002 |
| KR | 10-2007-0081504 | 8/2007 |
| WO | WO 91/16691 | 10/1991 |
| WO | WO 99/60481 | 11/1999 |
| WO | WO 00/30045 | 5/2000 |
| WO | WO 00/55778 | 9/2000 |
| WO | WO 01/09752 | 2/2001 |
| WO | WO 01/09792 | 2/2001 |
| WO | WO 01/84281 | 11/2001 |
| WO | WO 02/29636 | 4/2002 |
| WO | WO 2004/031986 | 4/2004 |
| WO | WO 2005/010683 | 2/2005 |
| WO | WO 2005/033979 | 4/2005 |
| WO | WO 2006/050278 | 5/2006 |
| WO | WO 2006/069199 | 6/2006 |
| WO | WO 2008/042614 | 4/2008 |
| WO | WO 2009/064694 | 5/2009 |
| WO | WO 2009/064840 | 5/2009 |
| WO | WO 2009/102391 | 8/2009 |
| WO | WO 2009/117468 | 9/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |

OTHER PUBLICATIONS

Equifax; "Welcome to Equifax Mobile," http://www.equifax.com/mobile/ as printed Mar. 18, 2011 in 2 pages.

Fenner, Peter, "Mobil Address Management and Billing for Personal Communications", 1st International Conference on Universal Personal Communications, 1992, ICUPC '92 Proceedings, pp. 253-257.

Irby, LaToya, "How Will a Late Payment Hurt My Credit Score?" http://web.archive.org/web/20101024113603/http://credit.about.com/od/creditscorefaq/f/how-late-payment-affects-credit-score.htm, Oct. 24, 2010, pp. 1.

U.S. Appl. No. 12/705,489, filed Feb. 12, 2010, Bargoli et al.

U.S. Appl. No. 12/705,511, filed Feb. 12, 2010, Bargoli et al.

Actuate, "Delivering Enterprise Information for Corporate Portals", White Paper, 2004, pp. 1-7.

"Aggregate and Analyze Social Media Content: Gain Faster and Broader Insight to Market Sentiment," SAP Partner, Mantis Technology Group, Apr. 2011, pp. 4.

Aharony et al., "Social Area Networks: Data Networking of the People, by the People, for the People," 2009 International Conference on Computational Science and Engineering, May 2009, pp. 1148-1155.

Aktas et al., "Personalizing PageRank Based on Domain Profiles", WEBKDD workshop: Webmining and Web Usage Analysis, Aug. 22, 2004, pp. 83-90.

Aktas et al., "Using Hyperlink Features to Personalize Web Search", WEBKDD workshop: Webmining and Web Usage Analysis, Aug. 2004.

"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=POD.

ABC News Now:Money Matters, as broadcasted Nov. 15, 2005 with guest Todd Davis (CEO of Lifelock), pp. 6.

Anonymous, "Credit-Report Disputes Await Electronic Resolution," Credit Card News, Chicago, Jan. 15, 1993, vol. 5, No. 19, p. 5.

Anonymous, "MBNA Offers Resolution of Credit Card Disputes," Hempstead, Feb. 2002, vol. 68, No. 2, p. 47.

Anonymous, "Feedback", Credit Management, ABI/INFORM Global, Sep. 2006, pp. 6.

Awoonor-Williams, Princess Josephine, Ph.D. "Gender and Credit: An Analysis of Women's Experience in the Credit Market", ProQuest Dissertations and Theses, 2004, pp. 148.

"Beware of 'Who Viewed My Profile' Apps on Facebook" Tech for Luddites, Mar. 15, 2010 printed Sep. 27, 2013 http://www.techforluddites.com/2010/03/beware-of-who-viewed-my-profile-apps-on-facebook.html.

Bielski, Lauren, "Will you Spend to Thwart ID Theft?" ABA Banking Journal, Apr. 2005, pp. 54, 56-57, 60.

BlueCava, "What We Do", http://www.bluecava.com/what-we-do/, printed Nov. 5, 2012 in 3 pages.

Buxfer, http://www.buxfer.com/ printed Feb. 5, 2014 in 1 page.

Check, http://check.me/ printed Feb. 5, 2014 in 3 pages.

(56) References Cited

OTHER PUBLICATIONS

Chores & Allowances, "Do Kids Have Credit Reports?" Oct. 15, 2007, http://choresandallowances.blogspot.com/2007/10/do-kids-have-credit-reports.html, pp. 5.
Comlounge.net, "plonesocial.auth.rpx" http://web.archive.org/web/20101026041841/http://comlounge.net/rpx as captured Oct. 26, 2010 in 9 pages.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
Collins, Michael J., "Exploring the Design of Financial Counseling for Mortgage Borrowers in Default," Journal of Family and Economic Issues, Springer Science+Business Media, Mar. 13, 2007, pp. 207-226.
"Consumers Gain Immediate and Full Access to Credit Score Used by Majority of U.S. Lenders", PR Newswire, ProQuest Copy, Mar. 19, 2001, p. 1.
"CreditCheck Monitoring Services," Dec. 11, 2000, pp. 1, lines 21-23.
"Credit Improvement", CreditRepair.com, Mar. 10, 2010, http://web.archive.org/web/20100310134914/http://www.creditrepair.com/credit/, as archived Mar. 10, 2010 in 2 pages.
Credit Plus, Inc., "Score Wizard", http://web.archive.org/web/20030806080310/www.creditplus.com/scorewizard.asp, as archived Aug. 6, 2003 in 1 page.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.
"Debt Settlement: Watch Video on how to Pay Your Debt Faster", http://www.debtconsolidationcare.com/debt-settlement.html printed Jan. 9, 2013 in 6 pages.
Demby, Elayne, "Special Report: Letting Consumers Know the Score—and More", Collections and Credit Risk, New York, Feb. 2003, vol. 8, Issue 2, p. 53, pp. 3.
Elliehausen et al., The Impact of Credit Counseling on Subsequent Borrower Behavior, The Journal of Consumer Affairs, Summer 2007, vol. 41, No. 1, pp. 1-28.
Equifax Consumer Credit Report http://www.equifax.com/home/, as retrieved on Sep. 17, 2008.
Equifax; "Equifax Credit Watch"; https://www.econsumer.equifax.co.uk/consumer/uk/sitepage.ehtml, dated Jun. 27, 2007 on www.archive.org.
Ettorre, "Paul Kahn on Exceptional Marketing," Management Review, vol. 83, No. 11, Nov. 1994, pp. 48-51.
Experian Consumer Credit Report http://www.experian.com/, as retrieved on Sep. 17, 2008.
Facebook, "Facebook helps you connect and share with the people in your life," www.facebook.com printed Nov. 16, 2010 in 1 page.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
"Fictitious Business Name Records", Westlaw Database Directory, http://directoy.westlaw.com/scope/default.asp?db-FBN-ALL&RS-W&VR=2.0 as printed Dec. 17, 2009, pp. 5.
Fitzpatrick, Alex, "Facebook Monitors Your Chats for Criminal Activity [Report]," Mashable, Jul. 12, 2012 printed Sep. 27, 2013 http://mashable.com/2012/07/12/facebook-scanning-chats/.

"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
"Guide to Benefits, MasterCard® Cardholder Smart Shopper Benefits", May 2005, pp. 10.
Herzberg, Amir, "Payments and Banking with Mobile Personal Devices," Communications of the ACM, May 2003, vol. 46, No. 5, pp. 53-58.
Hoofnagle, Chris Jay, "Identity Theft: Making the Known Unknowns Known," Harvard Journal of Law & Technology, Fall 2007, vol. 21, No. 1, pp. 98-122.
Hunt, Robert M.; Whither Consumer Credit Counseling? Business Review, Dec. 31, 2005, pp. 9-20.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Colombus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vname=PQD.
Ideon, Credit-Card Registry that Bellyflopped this Year, Is Drawing some Bottom-Fishers, The Wall Street Journal, Aug. 21, 1995, pp. C2.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
Intelius, "People Search—Updated Daily, Accurate and Fast!" http://www.intelius.com/people-search.html?=&gclid=CJqZIZP7paUCFYK5KgodbCUJJQ printed Nov. 16, 2010 in 1 page.
Iovation, Device Identification & Device Fingerprinting, http://www.iovation.com/risk-management/device-identification printed Nov. 5, 2012 in 6 pages.
"Judging Credit: Consumers Need Better Finance Tools", News Journal, Daytona Beach, FL, Dec. 28, 2002.
Lan, Joe, "The Top Portfolio Management Software," http://www.aaii.com/computerizedinvesting/article/the-top-portfolio-management-software, Includes Discussion thread, Fourth Quarter 2011, pp. 17.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lee, W.A.; "Experian, on Deal Hunt, Nets Identity Theft Insurer", American Banker: The Financial Services Daily, Jun. 4, 2003, New York, NY, 1 page.
Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.

(56) References Cited

OTHER PUBLICATIONS

Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-rny-kids-and-family printed Mar. 14, 2008 in 1 page.
LifeLock, Various Pages, www.lifelock.com/, 2007.
Littwin, Angela, "Beyond Usury: A Study of Credit-Card Use and Preference Among Low-Income Consumers", Texas Law Review, vol. 86, No. 3, pp. 451-506; Feb. 2008.
Lobo, Jude, "MySAP.com Enterprise Portal Cookbook," SAP Technical Delivery, Feb. 2002, vol. 1, pp. 1-13.
Lund, Graham, "Credit Bureau Data: Maximizing the Benefits," Credit Management, May 2004, ProQuest Central, pp. 44-45.
Magid, Lawrence, J., Business Tools: When Selecting an ASP Ensure Data Mobility, Los Angeles Times, Los Angeles, CA, Feb. 26, 2001, vol. C, Issue 4, pp. 3.
"Managing Debt?" Federal Trade Commission: Consumer Information, http://www.consumer.ftc.gov/articles/0158-managing-debt, printed Mar. 22, 2013 in 4 pages.
Manilla, http://www.manilla.com/how-it-works/ printed Feb. 5, 2014 in 1 page.
Meyers et al., "Using Your Social Networking Accounts to Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.
Micarelli et al., "Personalized Search on the World Wide Web," The Adaptive Web, LNCS 4321, 2007, pp. 195-230.
Microsoft, "Expand the Reach of Your Business," Microsoft Business Solutions, 2004, in 16 pages.
Mint.com, http://www.mint.com/ printed Sep. 18, 2008 in 2 pages.
Mint.com, http://www.mint.com/how-it-works/ printed Feb. 5, 2013 in 2 pages.
MS Money Software by Microsoft http://www.microsoft.com/Money/default.mspx as retrieved on Sep. 17, 2008.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
My ID Alerts, "Why ID Alerts" http://www.myidalerts.com/why-id-alerts.jsps. printed Apr. 3, 2012 in 2 pages.
My ID Alerts, "How it Works" http://www.myidalerts.com/how-it-works.jsps printed Apr. 3, 2012 in 3 pages.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory, http://directoy.westlaw.com/scope/default.asp?db=NA-ALL&RS=W&VR=2.0 as printed Dec. 17, 2009, pp. 5.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
"New for Investors: Asset Allocation, Seasoned Returns and More," Prosper, http://blog.prosper.com/2011/10/27/new-for-investors-asset-allocation-seasoned-returns-and-more/, pp. 4.
Next Card: About Us, http://web.cba.neu.edu/~awatson/NextCardCase/NextCardAboutUs.htm printed Oct. 23, 2009 in 10 pages.
Ogg, Erica, "Apple Cracks Down on UDID Use", http://gigaom.com/apple/apple-cracks-down-on-udid-use/ printed Nov. 5, 2012 in 5 Pages.
Organizing Maniac's Blog—Online Receipts Provided by MyQuickReceipts.com, http://organizingmaniacs.wordpress.com/2011/01/12/online-receipts-provided-by-myquickreceipts-com/ dated Jan. 12, 2011 printed Oct. 16, 2012 in 3 pages.
Paustian, Chuck, "Every Cardholder a King Customers get the Full Treatment at Issuers' Web Sites," Card Marketing, New York, Mar. 2001, vol. 5, No. 3, pp. 4.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 page.
PersonalCapital.com, http://www.personalcapital.com/how-it-works printed Feb. 5, 2014 in 5 pages.
Planwise, http://planwise.com printed Feb. 8, 2013 in 5 pages.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Privacy Rights Clearinghouse, "Identity Theft: What to do if it Happens to You," http://web.archive.org/web/19990218180542/http://privacyrights.org/fs/fs17a.htm printed Feb. 18, 1999.
"Qualifying for Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Quicken Online by Intuit http://www.quicken.intuit.com/, as retrieved on Sep. 17, 2008.
"Quicken Support", http://web.archive.org/web/20071231040130/http://web.intuit.com/support/quicken/docs/d_qif.html as archived Dec. 31, 2007 in 6 pages.
Ramaswamy, Vinita M., Identity-Theft Toolkit, The CPA Journal, Oct. 1, 2006, vol. 76, Issue 10, pp. 66-70.
Rawe, Julie; "Identity Thieves", Time Bonus Section, Inside Business, Feb. 2002, pp. 2.
Repici et al., "The Comma Separated Value (CSV) File Format", http://creativyst.com/Doc/Articles/CSV/CSV01.htm, Creativyst, Inc., 2002, pp. 10.
"Resolve Debt for Less: With Help from Freedom Financial" http://www.debtsettlementusa.com/ printed Jan. 9, 2013 in 6 pages.

(56) References Cited

OTHER PUBLICATIONS

Romig, Shane, "The Truth About Credit Repair", Credit.com, May 5, 2010, http://web.archive.org/web/20100505055526/http://www.credit.com/credit_information/credit_help/The-Truth-About-Credit-Repair.jsp printed Mar. 22, 2013 in 4 pages.
Roth, Andrew, "CheckFree to Introduce E-Mail Billing Serving," American Banker, New York, Mar. 13, 2001, vol. 166, No. 49, pp. 3.
SAS, "SAS® Information Delivery Portal", Fact Sheet, 2008, in 4 pages.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
Screenshot for Investment Account Manager v.2.8.3, published at http://www.aaii.com/objects/get/1642.gif by at least Aug. 30, 2011 in 1 page.
"Settling Your Debts—Part 1 in Our Debt Settlement Series", http://www.creditinfocenter.com/debt/settle_debts.shtml printed Jan. 9, 2013 in 6 pages.
ShoeBoxed, https://www.shoeboxed.com/sbx-home/ printed Oct. 16, 2012 in 4 pages.
Simpson, Glyn, "Microsoft (MS) Money (MSMoney FAQ, Help and Information Pages", pp. 2, Copyright © Glyn Simpson 1998-2007, http://web.archive.org/web/20071018075531/http://money.mvps.org/faq/article/196.aspx.
Singletary, Michelle, "The Littlest Victims of ID Theft", The Washington Post, The Color of Money, Oct. 4, 2007.
Stauffer et al., "Using HTML 3.2," Second Edition, 1996, Que Publishing, pp. 192-193.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
TransUnion Consumer Credit Report http://www.transunion.com/, as retrieved on Sep. 17, 2008.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
US Legal, Description, http://www.uslegalforms.com/us/US-00708-LTR.htm printed Sep. 4, 2007 in 2 pages.
Vamosi, Robert, "How to Handle ID Fraud's Youngest Victims," Nov. 21, 2008, http://news.cnet.com/8301-10789_3-10105303-57.html.
Waggoner, Darren J., "Having a Global Identity Crisis," Collections & Credit Risk, Aug. 2001, vol. vol. 6, No. 8, pp. 6.
Wesabe.com http://www.wesabe.com/, as retrieved on Sep. 17, 2008.
Yahoo! Search, "People Search," http://people.yahoo/com printed Nov. 16, 2010 in 1 page.
Yodlee | Money Center, https://yodleemoneycenter.com/ printed Feb. 5, 2014 in 2 pages.
You Need a Budget, http://www.youneedabudget.com/features printed Feb. 5, 2014 in 3 pages.
U.S. Appl. No. 09/411,683, filed Oct. 4, 1999.
"Disputes in Cyberspace 2001: Update of online dispute resolution for consumers in cross-border disputes", Consumers International, Nov. 2001, pp. 45, http://web.archive.org/web/20160414183303/http://www.consumersinternational.org/media/304196/disputes%20in%20cyberspace%202001.%20update%20of%20online%20dispute%20resolution%20for%20consumer%20in%20cross-border%20disputes..pdf.
Elangovan, A.R., "Managerial Third-Party Dispute Intervention: A Prescriptive Model of Strategy Selection", Academy of Management, Oct. 1, 1995, vol. 20, No. 4, pp. 800-830.
Equifax; "Places", http://web.archive.org/web/20111111113930/http://www.equifax.com/places as archived Nov. 11, 2011 in 1 page.
Equifax; "Places", http://www.equifax.com/places/ as printed Nov. 16, 2015 in 1 page.
Khan, Mickey Alam, "Equifax Recognizes Changing Customer Behavior with Four-Pronged Mobile Strategy", Mobile Marketer, http://web.archive.org/web/20151117005818/http://www.mobilemarketer.com/cms/news/strategy/9733.html, Apr. 19, 2011 in 10 pages.
LifeLock, http://web.archive.org/web/20110724011010/http://www.lifelock.com/? as archived Jul. 24, 2011 in 1 page.
PrivacyGuard, http://web.archive.org/web/20110728114049/http://www.privacyguard.com/ as archived Jul. 28, 2011 in 1 page.
Shin, Laura, "See an Error on Your Credit Report? Credit Karma Now Makes it Easy to Dispute", Nov. 12, 2015, http://www.forbes.com/sites/laurashin/2015/11/12/see-an-error-on-your-credit-report-credit-karma-now-makes-it-easy-to-dispute/, pp. 4.

* cited by examiner

ONLINE IDENTITY MONITORING

Site: [www.bank.com] ⌐ 501

LOGIN INFORMATION ⌐ 503

Username: [user123]
Password: [*****]

FREQUENCY: ○ EVERY DAY
504 → ○ ONCE A WEEK (Default)
○ ONCE A MONTH

⌐ 502

EMAIL MONITORING ⌐ 506

Email: [user@mail.com]
507
[X] I WILL AUTOMATICALLY FORWARD MY MAIL (LEARN HOW)

⌐ 505

DIRECT MONITORING

WE WILL DIRECTLY RECEIVE INFORMATION ABOUT CHANGES TO YOUR ACCOUNT WITH www.bank.com
[X] SIGN ME UP ⌐ 509

TO: User123 <user123@mail.com>
FROM: ONLINE IDENTITY MONITORING
SUBJECT: PASSWORD CHANGE DETECTED – SEVERE THREAT
— 601

Dear User123, — 602

We have detected a password change on your account with www.bank.com.

This may be a severe threat of identity theft. Please respond immediately to resolve this issue, by filling in the form below or visiting our website.

— 603

604 ◯ I initiated this change, so it may be safely ignored.

605 ● I did not initiate this change. Please take the following actions:

[X] Lock my account temporarily (Default)

[ ] Disable my account

[ ] Notify the credit bureaus
— 606

(SUBMIT)
— 607

FIG. 6

SYSTEMS AND METHODS OF IDENTITY PROTECTION AND MANAGEMENT

CROSS-REFERENCE TO RELATED APPLICATIONS

This application is a continuation of U.S. application Ser. No. 13/234,637, filed Sep. 16, 2011, titled "SYSTEMS AND METHODS OF IDENTITY PROTECTION AND MANAGEMENT". The above-identified application is hereby incorporated by reference herein in their entireties.

BACKGROUND

This disclosure relates to personal information management, and particularly, systems and methods for management of identity and personal information on external services.

Communication systems and network systems such as the Internet enable users to access a multitude of services such as e-commerce services, banking services, credit services, social networking services, and the like. Users often maintain relationships with many of these services. They may have accounts with these services accessed by credentials such as user names and passwords. Furthermore, these services may store personal information of users, such as personal names, relationships with others, home and residence addresses, telephone numbers, credit card numbers, financial information, and so on. Such users often rely on these services to maintain this information, and any compromise to the security or accuracy of this information may impose substantial costs on those users. For example, if an unauthorized person manages to gain access to the user's account and change that user's password, login information, or personal information, then that user may become unable to access his or her account and may be forced to deal with the fallout of identity theft, which can be costly and time-consuming for the user.

In order to prevent such identity theft and unauthorized access, online services often send out notifications of changes to personal information on users' accounts. For example, where a user changes his or her password, online services often send out an email confirmation to notify the user of the password change. Unfortunately, such notifications may become too numerous and burdensome for the user to carefully review to detect fraud and/or identity theft. Additionally, such notifications may be hidden among other communications, such as other emails, and thus not be noticed by the user in a timely manner. For example, notifications may be misclassified as junk mail or spam, possibly resulting in them going unnoticed by the user. Thus, such notifications may be ignored by users and thus become ineffective.

SUMMARY

Accordingly, disclosed herein are systems and methods of management of identity and personal information, such as account information stored by service providers. The systems and methods disclosed herein enable a user to effectively detect relevant events indicative of changes to identity and/or personal information, such as changes to passwords, login information, address information, and other personal information associated with the user's various accounts with service providers. Additionally, the systems and methods disclosed herein may enable the user to specify automatic actions to be taken in response to such events. Thus, the user may be relieved of the need to manually monitor and/or respond to such events and may be enabled to rapidly respond to those events.

In one embodiment, a method of monitoring and handling potential identity theft threats is performed by a monitoring computer having one or more computer processors. The monitoring computer receives a request from a user to monitor an account of the user with an online service provider. The request includes personal information associated with the user and user preferences for one or more protective actions to be taken in response to detection, by the monitoring computer, of a change or attempted change to personal information associated with the account. The monitoring computer periodically monitors one or more external data sources for indications of changes to personal information associated with the account. The monitoring computer detects a change or attempted change to personal information associated with the account. The monitoring computer determines a risk level associated with the detected change or attempted change to personal information associated with the account. The monitoring computer transmits a notification to the user via a communication channel selected based on the determined risk level and/or the user preferences. The monitoring computer initiates one or more protective actions selected based on one or more of the determined risk level or the user preferences. Further unauthorized access to the account may be prevented by the one or more actions.

In an embodiment, periodically monitoring one or more external data sources for indications of changes to personal information comprises periodically connecting to an external service, providing the external service with login credentials associated with the user, and determining whether the external service accepts the provided login credentials.

In an embodiment, periodically monitoring one or more external data sources for indications of changes to personal information comprises periodically retrieving electronic messages associated with the user and analyzing the content of the retrieved messages to determine whether any of the messages indicates a change to personal information.

In an embodiment, the risk level may be determined at least in part based on whether a preauthorization for the change or attempted change to personal information was received.

In an embodiment, the one or more protective actions are initiated subsequent to receiving user approval for initiating the one or more protective actions.

In an embodiment, the one or more protective actions are initiated without requiring user approval for initiating the one or more protective actions.

In one embodiment, a computing system is configured to monitor and handle potential identity theft threats. The computing system includes a computer-readable storage medium having stored thereon a plurality of executable software modules. The computing system includes one or more computer processors configured to execute the plurality of software modules stored on the computer-readable storage medium. The computing system includes a network interface. The computing system includes a message monitoring module configured to retrieve an electronic message and determine whether the electronic message indicates a change or a possible change to personal information. The computing system includes an event notification module configured to determine a risk level associated with the electronic message in response to the message monitoring module determining that the electronic message indicates a change or a possible change to personal information. The event notification module may be further configured to execute one or more user-customizable responsive actions based upon the risk level associated with the electronic message as determined by the event notification module.

In an embodiment, the message monitoring module may be configured to retrieve the electronic message by automatically logging into one or more email accounts and gathering messages from the one or more email accounts.

In an embodiment, the message monitoring module may be configured to retrieve the electronic message by receiving messages sent to the computing system.

In an embodiment, at least one of the user-customizable responsive actions may be sending an electronic notification identifying the possible change to personal information.

In an embodiment, the event notification module may be configured to execute at least a portion of the user-customizable responsive actions only in response to receiving a user confirmation message.

In an embodiment, the user-customizable responsive actions are selected based upon stored user preferences and the risk level associated with the electronic message.

In an embodiment, the event notification module may be further configured to determine whether the possible change to personal information was preauthorized, and further configured to execute different user-customizable responsive actions if the possible change to personal information was preauthorized.

In an embodiment, a non-transitory computer-readable medium comprises executable instructions configured to cause one or more computer processors to perform operations such as the following. The system periodically determines whether a network service is accessible based on a set of user credentials, by performing operations on a periodic basis. The system transmits a login request to the network service. The login request comprises the user credentials formatted in accordance with a protocol used by the network service. The system receives a login response from the network service. The system determines whether the login response indicates that the network service did not accept the user credentials. The system, in response to a determination that the login response indicates that the network service did not accept the user credentials, performs one or more event responses, selected based at least upon user preferences relating to the network service.

In an embodiment, transmitting a login request to the network service comprises transmitting an HTTP request to the network service.

In an embodiment, determining whether the login response indicates that the network service did not accept the user credentials comprises comparing the login response to one or more predefined parsing rules associated with the network service.

In an embodiment, at least one of the event responses may be sending an electronic notification identifying the possible change to personal information.

In an embodiment, at least a portion of the event responses may be performed only in subsequent to receiving a user confirmation message.

In an embodiment, the event responses may be selected based upon a risk level determined based on the login response.

In an embodiment, the operations may also include determining whether the possible change to personal information was preauthorized. The event responses are selected based at least in part on whether the possible change to personal information was preauthorized.

BRIEF DESCRIPTION OF THE DRAWINGS

FIGS. 5A and 5B are sample user interfaces for specifying monitoring services as used in an embodiment.

FIG. 6 is a sample notification email that may be sent in response to an event as used in an embodiment.

DETAILED DESCRIPTION

Figure 1:
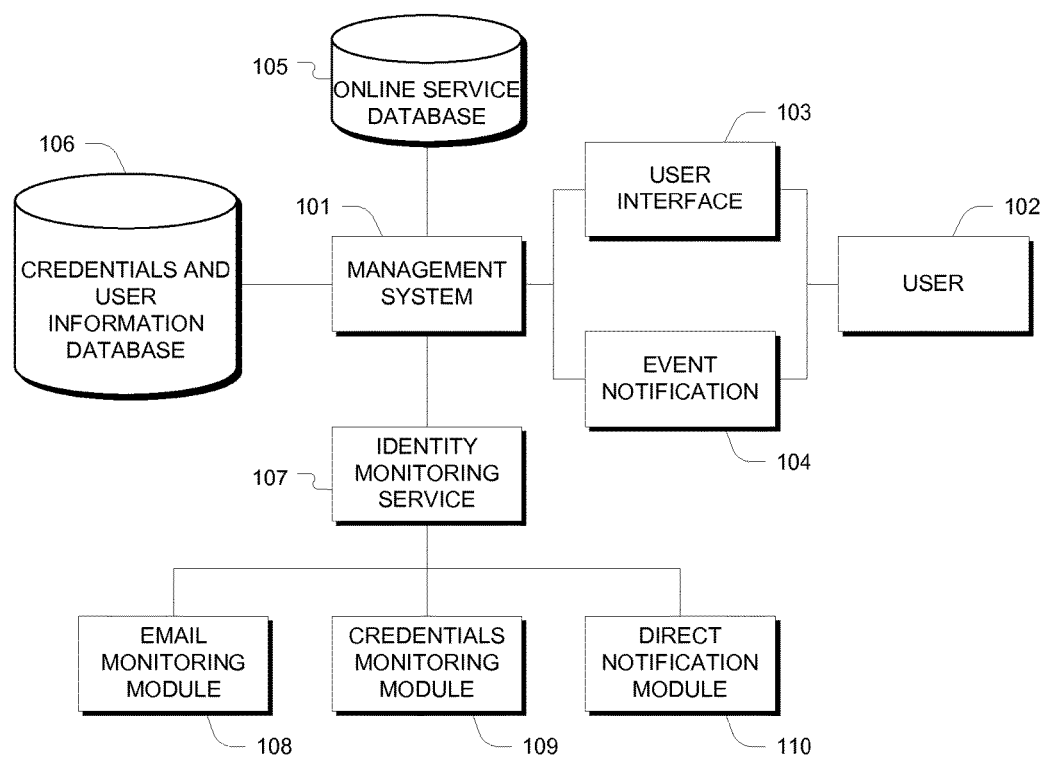
FIG. 1 is a block diagram representing a system of identity protection and management as used in an embodiment.

FIG. 1 is a block diagram of a system of identity protection and management, as used in an embodiment. The system may comprise one or more computing devices, and various elements depicted in FIG. 1 may be included in a single computing device, in separate individual computing devices, or in any combination thereof. The computing device or devices implementing the system of FIG. 1 may be connected to one or more networks such as the Internet by which they may communicate with external entities and data sources.

In an embodiment, the system comprises a management system 101 which performs methods of identity protection and management, as described throughout this specification. Management system 101 may provide various interfaces by which users 102 may access data on the management system. For example, the management system may provide one or more user interfaces via module 103 that may be accessed by users 102. Such user interfaces may include, for example, HTML interfaces, mobile device or tablet computer application interfaces, RSS feeds, audiovisual interfaces, textual interfaces, application programming interfaces, and the like. Additionally, management system 101 may enable users 102 to access data via event notifications module 104. Such event notifications may be sent by any number of means, including, for example, email, text message, instant message, telephone communications, physical mail, and other forms of communication known to those of skill in the art. Management system 101 may provide further interfaces to users 102, other than those provided by modules 103 and 104, as may be known to those of skill in the art.

Management system 101 may have access to various data repositories, in an embodiment. The data repositories may be any of various forms of data storage that may be accessed by a computing system, such as hard drives, tape drives, flash memory, random-access memory, read-only memory, EEPROM storage, and so on, as well as any combination thereof. The data may be formatted within the repositories in one or more formats, referred to herein as "data structures," such as flat text file storage, relational databases, non-relational databases, XML, comma-separated values, Microsoft Excel files, and so on, as well as any combination thereof. The data repositories may provide various forms of access to the stored data, such as by filesystem access, network access, a SQL protocol (e.g. ODBC), HTTP, FTP, NFS, CIFS, and so on, as well as any combination thereof. As used throughout this specification, the terms "data store," "repository," "storage device," and the like may refer to any such data repository as described herein or otherwise known to those of skill in the art.

In an embodiment, management system 101 may be connected to online service data repository 105 which may include information on various online services such as website services, social networking services, online banking services, e-commerce services and the like. The data included in repository 105 may include data such as a URL and/or location for an online service, types of login credentials for the online service, methods of accessing and providing credentials for the online service, forms of communication used by the online service such as email notifications, data provided by the online service and so on.

In an embodiment, repository 105 receives information on an online service by manual entry performed by an operator or administrator of management system 101. In an embodiment, management system 101 includes automated software routines that gather appropriate information from online services, so that repository 105 may be populated and/or updated automatically. In an embodiment, management system 101 receives information descriptive of online services directly from those online services, and may use that descriptive information to populate repository 105.

Additionally, management system 101 may be in communication with credentials and user information repository 106. The repository may be physically stored on the same storage medium as repository 105 or on different storage media, and the two repositories may be implemented in a single repository in an embodiment. The credentials and user information repository 106 may include information about individual users and user accounts. Such information may include login credentials to access the management system so that users may establish accounts and utilize the services provided by the management system. Additionally, repository 106 may include information about users' online identities. Such information may include, for example, login credentials for various online services, types of identities of services to be monitored, types of services to be monitored, preferences for monitoring of online services, preferences for notifications, preferences for levels of urgency for notifications, and the like.

Management system 101 may include or be connected to identity monitoring service 107. The identity monitoring service may provide periodic or on-demand monitoring of online identity and personal information. For example, identity monitoring service 107 may execute an email monitoring module 108 configured to monitor user emails. Such monitoring may be performed either immediately upon receipt of emails for individual users or on a periodic basis by retrieving relevant emails from a user's account. Identity monitoring service 107 may also execute a credentials monitoring module 109 which may be configured to periodically attempt to access various online services on behalf of users and retrieve personal information associated with those users in order to detect changes or updates to identity and personal information associated with those users. Identity monitoring service 107 may further execute a direct notification module 110 which may be configured to directly receive information about identity and personal information changes from one or more online services. Such direct notifications may be received through standard network protocols such as HTTP or specialized communication protocols including secure communication protocols established with online services.

In an embodiment, monitoring service 107 performs various monitoring tasks, as described previously or as may be contemplated otherwise, to detect events. Events may be related to changes in identity and/or personal information maintained by a service. For example, if a user's login name, password, or other authentication credentials are changed on an online service, the change may be detected by monitoring service 107, thus triggering an event. Monitoring service 107 may also be configured to detect changes to personal information stored online, such as address information, as a type of event. An event indicating an address change could inform a user, for example, of an unauthorized attempt to cause goods or services to be delivered to a different location, which would be a form of identity theft. Other activities may also be considered events by the system, such as online orders or service requests. If the monitoring service 107 is able to trigger events in response to unauthorized online orders or service requests, then the system may be able to stop the orders from being shipped or the services being performed, thus again minimizing the impact of identity theft.

Figure 2:
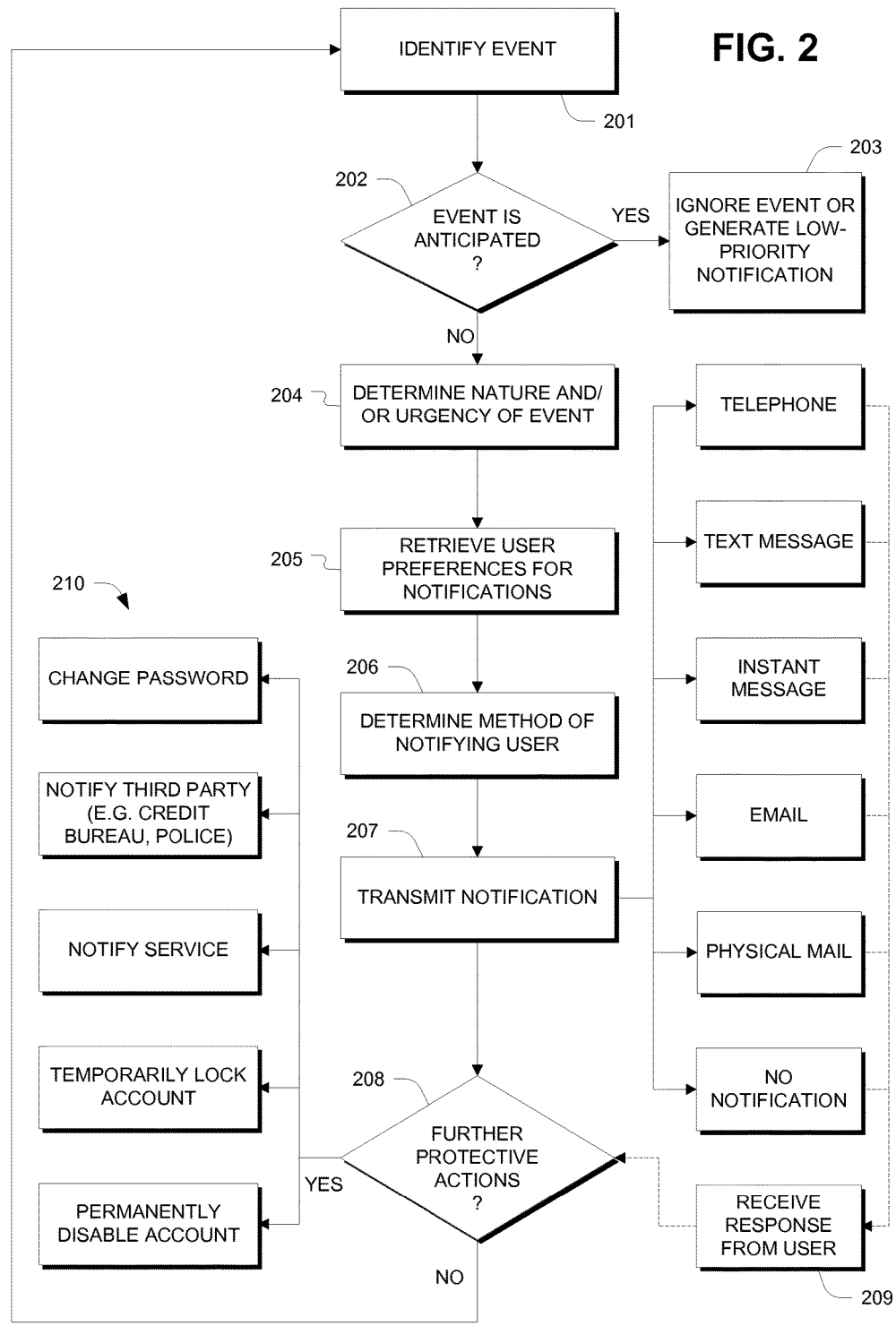
FIG. 2 is a flow chart of a process of handling a detected event as used in an embodiment.

FIG. 2 is a flow chart of a process of handling and/or responding to a detected event as used in an embodiment. Such a process may be used by the event notification module 104 of management system 101 as shown in FIG. 1. In various embodiments, additional blocks may be included, some blocks may be removed, and/or blocks may be connected or arranged differently from what is shown.

At block 201, an event is identified. Such an event may be triggered by one of any number of modules such as the user email module 108, credentials monitoring module 109, or direct monitoring module 110 of the identity monitoring service 107 as shown in FIG. 1. The event identified at block 201 may, in various embodiments, include information about an associated user, an associated online service, personal information associated with the event, other relevant information, or any combination thereof.

At block 202, the system determines whether or not the event identified at block 201 was anticipated. An event may be anticipated, for example, because a user has intentionally caused a change to that user's personal information. For example, where a user decides to change a password or an online account, the password change may be anticipated because it was intended by the user.

The determination of whether an event is anticipated may be based on preauthorization data which includes information provided by users about which events to anticipate. Users may provide preauthorization for events by contacting the system and indicating that a particular event is to be anticipated, via a web interface, mobile application, or other means. Additionally or alternatively, algorithms including artificial intelligence algorithms may be used to determine whether an event is anticipated or how likely an event is to be non-anomalous, known, and/or authorized by the user. Such algorithms may be similar to, for example, algorithms used to detect credit card fraud, as will be known to those of skill in the art.

If the event is anticipated, then at block 203, the system ignores the event or alternatively generates a low-priority notification and/or response. This provides the advantage that the user will only be notified of unexpected and/or important events, so that the user will not be inundated with unnecessary notifications.

If the event is not anticipated then at block 204 the system determines the nature, urgency, and/or other characteristics of the event. This determination may be based on any number of factors including, for example, the nature of the event identified, user preferences stored by the system, frequency of events identified with respect to this user or other users on the system, general information maintained by the system regarding trends in identity fraud, and other information that may be available to the system.

At block 205, the system retrieves user preferences for notifications. These user preferences may be retrieved from one or more data repositories such as repository 106 shown in FIG. 1. Then, based on the nature and urgency of the event determined at block 204, the user preferences retrieved at block 205, and/or other information available to the system, the system may determine at block 206 an appropriate event response, such as a method of notifying the user of the identified event. The system may then generate a notification 207 to be provided to the user by any number of forms of communication known to those of skill in the art, including, telephone notifications, text messages, instant messages, email messages, physical mail messages and/or other forms of communication, as well as any combination thereof. In an embodiment, the system may determine that no notification is required and thus send no notification to the user. In an embodiment, the system may use default preferences provided by an administrator of the system or built into the system in addition to, or rather than, user preferences.

At block 208, the system determines whether further event responses, such as protective actions, are to be taken in response to the event that has been identified, and what actions to take, if any. The determination of further protective actions at block 208 may occur immediately after the determination of the method to notify the user at block 206, or it may occur at a later time. In an embodiment, the system first sends out a notification 207 and then waits to receive a response from the user, at block 209. Such a system enables the user to choose not to perform the protective actions, for example because the triggering event was actually caused by the user, but possibly not preauthorized. In an embodiment, the system may determine whether to wait for a user response at block 209 based on user preferences determined at block 205 or based on other information available to the system. In an embodiment, the system may perform some actions automatically and other actions only after user response.

The protective actions determined at block 208 may include any number of protective actions 210. Such actions may include notifying a third party such as a credit bureau or the police, notifying the online service, temporarily locking the user's account on the service, temporarily or permanently disabling the user's account on the service, changing the user's password on the service, or other actions that may be described throughout this specification or known to those of skill in the art.

Figure 3:
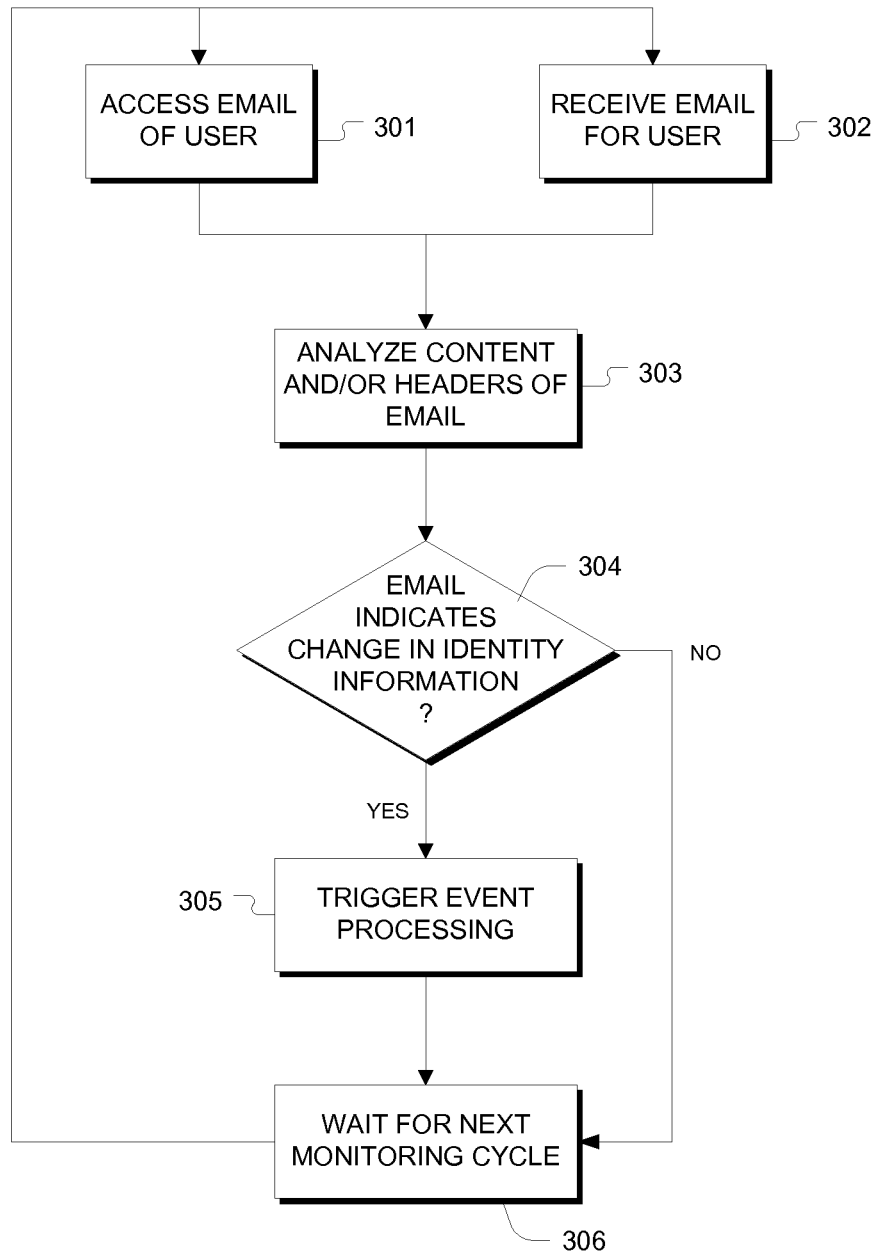
FIG. 3 is a flow chart of a process of analyzing messages for personal information change data as used in an embodiment.

FIG. 3 shows a flow chart of a process of reviewing emails for identity or personal information changes, as used in an embodiment. In various embodiments, additional blocks may be included, some blocks may be removed, and/or blocks may be connected or arranged differently from what is shown.

Although the process of FIG. 3 is described with respect to email messages, the process may be applied to other forms of communication as will be known to those of skill in the art. For example, the system may be configured to receive and analyze text messages received on the user's cell phone. In another embodiment, the system may be configured to automatically review physical mail that may have been, for example, scanned in by the user.

The system may access emails in any number of ways. For example, at block 301, the system may directly access the user's email. This may be done, for example, by the system maintaining the user's email account, login and password and periodically accessing the user's email account to retrieve messages. Such retrieval may be performed via an online interface such as a web interface, an IMAP interface, a POP interface, or the like. Alternatively or additionally, the system may receive emails for the user directly at block 302. For example, the user may configure one or more email accounts to automatically forward and/or copy all messages to a specialized email address operated by the system so that the system may receive messages immediately. In an embodiment, the user may maintain one or more email accounts on the system, in which case all messages may be delivered to the system or otherwise accessed so that they may be reviewed.

Upon accessing one or more messages from block 301, from block 302, and/or by other means, the system analyzes the content and/or headers of the email messages at block 303. The data analyzed by the system at block 303 may include any data associated with an email message such as the sender of the message, the recipient of the message, the time and date of the message, the subject line of the message, any Internet headers included in the message, digital signatures attached to the message, attachments to the message, images included in the message, the content of the message, MIME parts of the message, Internet addresses such as IP addresses associated with the message, and so on. For example, the system may identify messages containing the terms "password change," "address change," "email address change," "account created," "account modified," "account removed," and so on. In various embodiments, the parameters such as keywords to be identified may be manually configured, or they may be automatically determined by an automated process such as a machine learning process, Bayesian analysis, neural network processing, and so on.

In an embodiment, the system may be configured to recognize one or more specialized headers in the message. Such a specialized header may be used, for example, by an online service to enable the automatic detection of messages relating to personal information changes. For example, when a user changes a login name or password on an online service account, the online service may be configured to send an email to that user with a specialized header indicating that the message relates to a login name or password change. In an embodiment, such a specialized header may include one or more digital signatures to provide verification that the message originated from the online service.

At block 304, the system determines whether the email indicates a change in identity information based on the analysis performed at block 303. Such identity information changes may include changes to the user's login name, password, personal name, account number, associated accounts, home address, mailing address, telephone number, email address, or the like. In an embodiment, the system detects attempted changes as well as or alternatively to successful changes, in which case the system may provide notifications as to attempted changes.

If at block 304 the system determines that the email indicates a change (or attempted change) in identity information, then at block 305 the system triggers an event for processing. This triggering of an event may invoke an event notification process, such as that shown in FIG. 2, which determines whether a notification should be transmitted, and attributes of the notification. In an embodiment, at block 305, the event is processed (e.g. by the process outlined in FIG. 2) immediately upon the determination that the email indicates a change in identity information. In an alternate embodiment, the system may initiate event processing at block 305 on a regular or periodic basis such as once every hour, once every day, or once every week. Whether the event is processed immediately or at a later time may depend on user preferences and/or the nature of the event, including the urgency of the event.

If the email is determined not to indicate a change in identity information at block 304 or after the event is processed at block 305, the system waits for the next monitoring cycle at block 306. The system may be configured to perform the monitoring shown in blocks 301 or 302 on a periodic basis such as a daily, weekly, or monthly basis. In such a case, the system would, at block 306, wait for the appropriate period of time to elapse prior to again reviewing messages. In an additional embodiment, the system may wait at block 306 for further messages to be received prior to again performing either of block 301 or 302.

Figure 4:
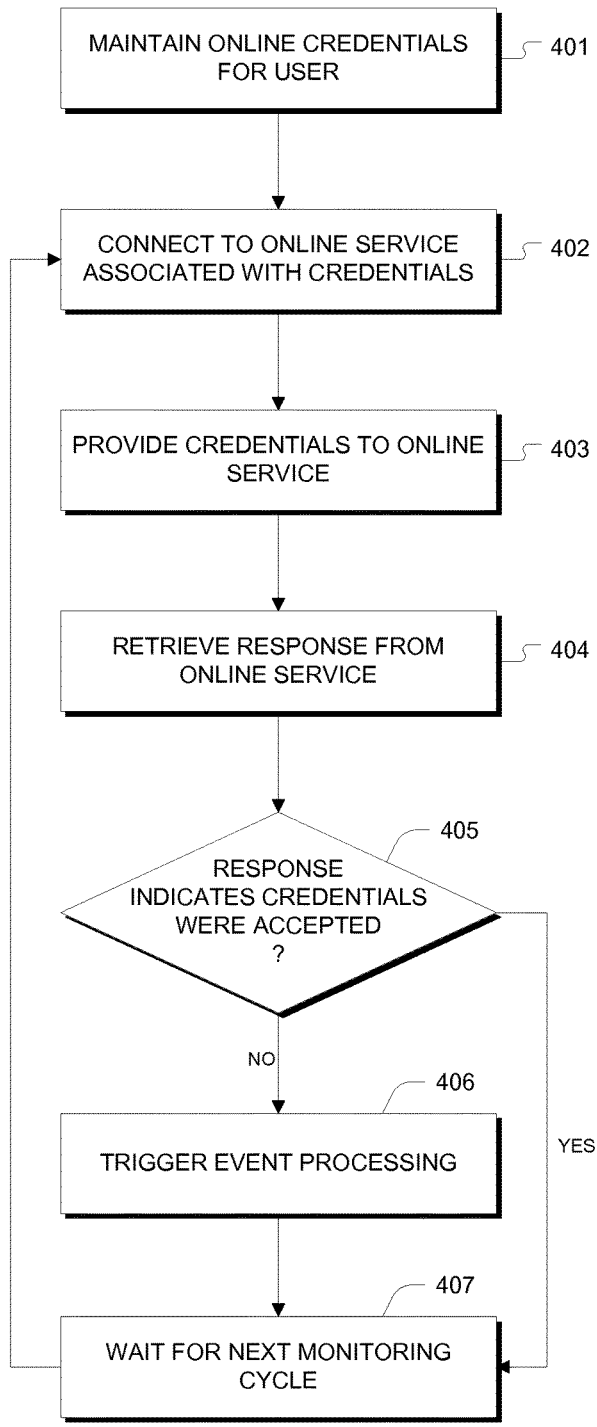
FIG. 4 is a flow chart of a process of verifying credentials with a service as used in an embodiment.

FIG. 4 is a flowchart of a process of verifying credentials with an online service, as used in an embodiment. Although this process is described with respect to an online service connected via a network such as the Internet, this process may equally be applied to services accessible by other forms of communication. For example, this process may be applied to telephone services by automatically dialing and providing information to such services. In various embodiments, additional blocks may be included, some blocks may be removed, and/or blocks may be connected or arranged differently from what is shown.

At block 401, the system maintains online credentials for a user. These online credentials may include a login name and a password. Other information that may be used to authenticate users to online services may also be stored at block 401.

At block 402, the system connects with an online service associated with the credentials maintained at block 401. The system may connect with the online service by any number of means. For example, it may attempt to access the main web page of the online service or it may attempt to access a login page of the online service. In another embodiment, the system may access a special application programming interface (API) provided by the online service. Such an API may be an HTML based API such as a SOAP API or a REST API. In an embodiment, the communications performed at block 402 are performed over a secure channel. In an embodiment, the system maintains instructions for how to connect with the online service at block 402 in one or more repositories such as the online service repository 105 of FIG. 1.

At block 403, the system provides the credentials maintained at block 401 to the online service to which the system has connected at block 402. The system may be configured to provide those credentials to the online service in a manner expected by the online service. The appropriate manner of providing those online credentials may be stored in a repository such as online service repository 105 in FIG. 1.

In an embodiment, the credentials are provided over a secure communications channel. In an embodiment, the credentials may be provided by an HTTP protocol such as an HTTP POST form submission. In an embodiment, the credentials may be transmitted using an HTTP Basic or Digest authentication protocol. In other embodiments, the credentials may be transmitted using a challenge/response protocol, a digital signature, or by other means. Additionally and/or alternatively, the credentials, or any part of the credentials such as a password, may be encrypted or may be obfuscated using a hash function, such as a cryptographic or one-way hash function.

At block 404, the system retrieves a response from the online service, subsequent to the system providing the credentials at block 403. The system may interpret and/or parse the response based on information about the online service, such as information stored in repository 105 of FIG. 1. At block 405, the system analyzes the response retrieved at block 404 to determine whether the response indicates that the credentials were accepted. Such a determination may be specific to particular online services, may depend on the nature of the content received, and/or may be based on parsing of the response data for inclusion of content indicative of whether the credentials were accepted. For example, where the content is a webpage indicating that the password was not correct, then the system may determine that the credentials were not accepted.

If the credentials are not accepted at block 405, then at block 406 the system triggers an event for processing. Such triggering of an event may invoke the performance of a process such as that shown in FIG. 2. As explained previously with respect to FIG. 3, the triggering of the event at block 406 may be performed immediately in response to the determination that the credentials were not accepted or it may be performed at a later time.

If the response indicates that the credentials were accepted at block 405 or after the event is processed at block 406, the system waits for the next monitoring cycle at block 407. The particular intervals at which the system performs the monitoring of online credentials may be specified by the user as a preference. Alternately, the system may include a default period for monitoring. In an embodiment, the system waits for a predefined action that indicates that the credentials should be tested, such as a user-initiated request or a notification from the online service being monitored.

Figure 5B:
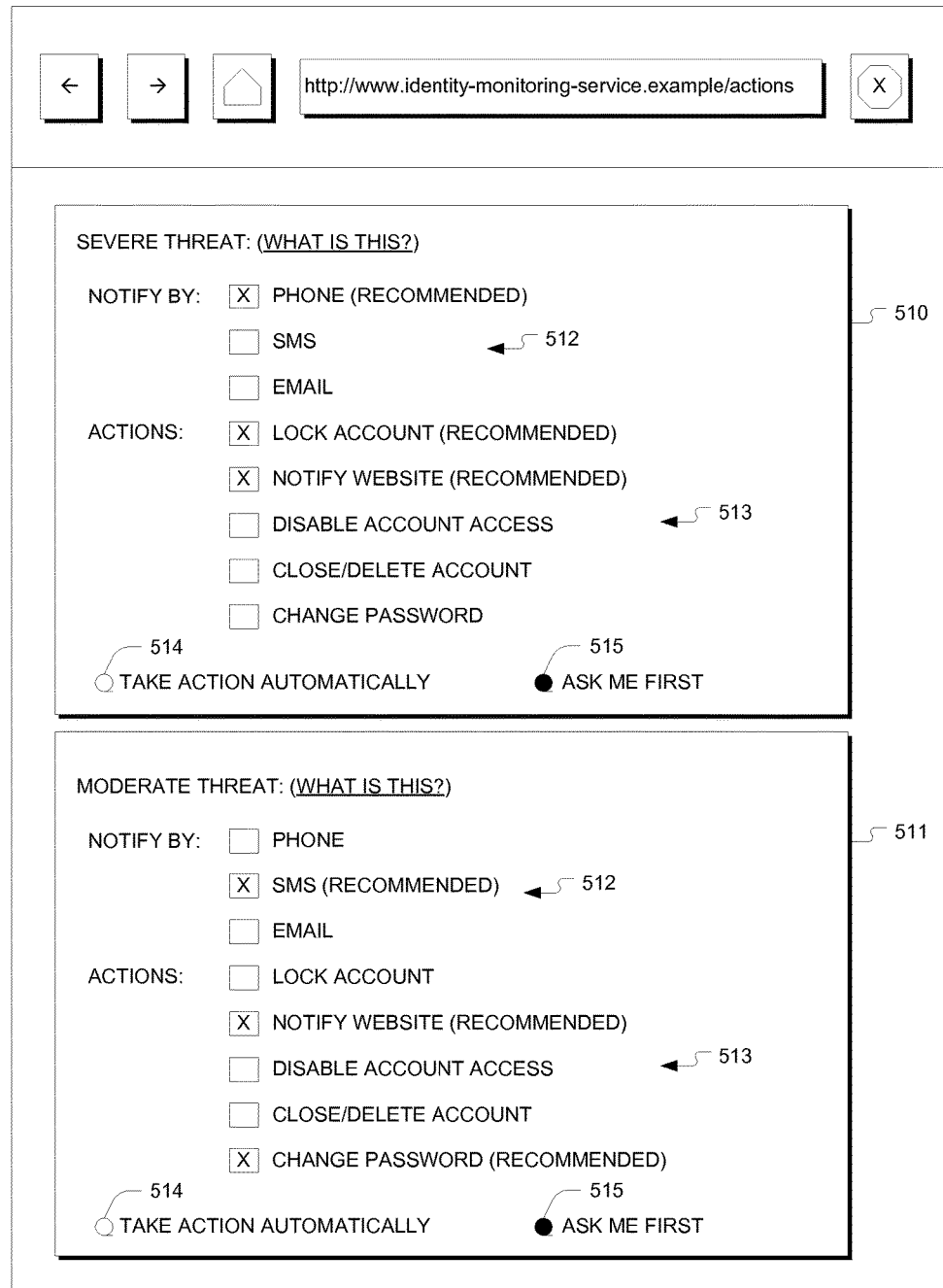

FIGS. 5A and 5B depict sample user interfaces for specifying monitoring services, as used in an embodiment. A user may use such interfaces to manage the performance of monitoring services such as those shown in FIGS. 3 and 4. Additionally, the user may use such interfaces to manage the handling of event notifications and other protective actions such as those shown in FIG. 2. In an embodiment, the system may provide these interfaces to a user computing device or other device by means of a website, a mobile phone application, a tablet device application, a telephone call system, an application programming interface or by other means of communication. In an embodiment, multiple interfaces may be provided.

FIG. 5A illustrates an embodiment of an interface for establishing email monitoring preferences. In this embodiment, the user is able to select an online service using interface element 501. The user may select an online service by typing in a name and/or URL of the online service. In an embodiment, the user may alternatively select the online service using a predefined list. In other embodiments, the user may select the online service by other means. In an embodiment, the user may be able to specify the methods of monitoring a service, thus possibly enabling the user to monitor services not already known to the system.

The user may provide options for online credentials verification using the interface elements shown in block 502. Such information may be used to control a process such as that shown in FIG. 4. The user may provide login credentials such as a user name and password using interface elements 503. Additionally, the user may provide information such as the frequency of monitoring using interface elements 504. The system may request additional information or less information depending on the particular requirements of the monitoring service provided by the system.

The user may configure email monitoring services using the interface elements included in block 505. The information provided in block 505 may be used to configure the performance of a method such as that shown in FIG. 3. For example, the user may provide an email address to be monitored using interface element 506. In an embodiment where the user wishes to have the system retrieve emails from the specified account, the user may provide login and password information or other login information to the system. In another embodiment, the system may be configured to have access to certain email services so that login credentials are not required for the email monitoring service to function.

Additionally, the user may choose to forward emails to the system and may indicate a desire to do so at using interface element 507. Upon selecting this interface the system may provide instructions to the user as to how to forward email to the system. Additionally, the system may configure itself to receive emails and perform monitoring on those emails.

The user may configure direct monitoring of the selected online service using the interface elements shown in block 508. To enable direct monitoring, the user may select interface element 509. Selection of this interface element may cause the system to periodically query the online service for identity or personal information changes. The user may be provided with options for how frequently the monitoring is to be provided. Alternatively, selecting interface element 509 may cause the system to notify the online service of the user's interest in identity and personal information monitoring. Such a request may cause the online service, based on a prior agreement between the system and the online service, to send notifications to the system in response to the online service detecting changes (and/or attempted changes) to the user's identity or personal information. Such monitoring has the advantage that the system may only receive notifications about verified and actual information changes rather than likely information changes detected either through online monitoring, email monitoring or by other means.

In the embodiment shown in FIG. 5, the various forms of monitoring are associated with a particular site provided using interface element 501. In other embodiments, some or all of the forms of monitoring need not be associated with a particular site. For example, a user may be able to use email monitoring, in which case the system may, upon detecting a message of interest, determine a site or online service associated with the message and perform actions based on that message. Similarly, the user may sign up for direct monitoring without specifying a particular site, and the system would process events based on any notifications relating to the user and received from online services. Such embodiments may thus relieve the user of having to manually specify every site or service to be monitored.

Where the system provides other monitoring means, the interface shown in FIG. 5A may include further sections and interface elements to receive configuration settings for those monitoring means. In embodiments that do not implement all the monitoring means shown in FIG. 5A, the interface may be adjusted accordingly.

Turning to FIG. 5B, the system may present a user interface for specifying responses to detected events. The information provided by the user in such an interface may be used to configure the performance of a method such as that shown in FIG. 2.

In an embodiment the interface includes options for various threat or urgency levels. For example, options for severe threats are shown in box 510. Options for moderate threats are shown in box 511. Other levels of threats may also be included on this interface and/or other interfaces. Additionally, in other embodiments the system may categorize threats using different terminology or different categorizations. For example, the system may categorize events as password change events, address change events, login name change events, and so on. In such a case, the interface of FIG. 5B may display boxes for types of event categories. In an embodiment, the categorizations may be account-dependent and/or user-defined.

In an embodiment, the system provides options for notification and/or actions to be taken in response to particular events. For example, interface elements 512 provide options for notification delivery options in response to a severe threat. Interface elements 513 provide options for actions to be taken in response to a severe threat. In an embodiment the system indicates that certain notifications and/or actions are recommended. In an embodiment the recommended notification and/or actions are selected by default.

Additionally, the interface provides options for when the action should be taken. For example using element 514 the user may request to take an action automatically upon detection of the events. Using element 515, the user may request that the system ask the user before taking any further actions. In an embodiment, the recommended actions and/or notifications may change based on whether the user wishes to be asked before taking the action or taking the action automatically. In an embodiment, the interface may provide further controls for specifying that some actions are to be taken without user confirmation, and other actions are to be taken only after user confirmation.

The recommended actions may be dependent as well upon the threat level of the events. As shown in interface elements 514 and 515, the recommended notifications and actions may differ for moderate threats as opposed to severe threats. Thus, the system may recommend levels of notification and/or actions that are appropriate to particular threats, so that users need not select forms of notification and/or actions without prior suggestion.

FIG. 6 shows a sample notification email sent in response to an event, as used in an embodiment. The notification may be sent by any number of means such as by email, by text message, by voicemail, by telephone call, via a mobile phone application, via a portable computer application, or by other means.

The notification message includes pertinent information relating to the detected events. For example, the notification shows in subject line 601 that the event is a password change and that it is a severe threat. The notification message may also indicate the online service at which the event was detected 602 and it may provide information about responding to the event 603. Additionally, in an embodiment, the notification message may include a link to the content that triggered the event and/or a copy, snippet, summary, or other representation of the content that triggered the event, such as the email from the online service or the page returned by the attempted login.

In an embodiment, the notification message may provide options for the user to respond to the event. By providing these options in the notification message itself, the system provides users with the benefit of being able to respond quickly and informedly to the detected events. In an alternate embodiment, the notification message may provide a link or other mechanism by which the user may access a website, mobile phone application, or other interface for responding to the event. Such an interface may appear much like the interface described below with respect to FIG. 6.

In the embodiment shown in FIG. 6, the user may indicate using interface element 604 that the event was initiated by the user so that it may be ignored. If the user did not initiate the change, however, then the user may select interface element 605 and further select actions to be taken using interface elements 606. In an embodiment, interface elements 606 are only displayed if interface element 605 is selected to indicate that the event was not initiated by the user. In an embodiment, the elements 606 that are selected by default are based on preferences provided by the user, for example, using an interface such as that shown in FIG. 5B.

Notification email may also include an interface control 607 to enable the user to submit the information provided using element 604, 605, and 606. Upon submitting this information to the system, the system may then undertake the appropriate actions by for example applying block 208 as shown in FIG. 2.

Other embodiments of the notification message shown in FIG. 6 may be used, and may include different information from that shown. In an embodiment, the contents of the notification message are customized to the particular type of event detected. In an embodiment, where some actions have already been taken, the notification message may include information indicating the results of the actions taken. In an embodiment, upon the user requesting certain actions to be taken using the notification message, a further message confirming the results of those actions is sent to the user.

Figure 7:
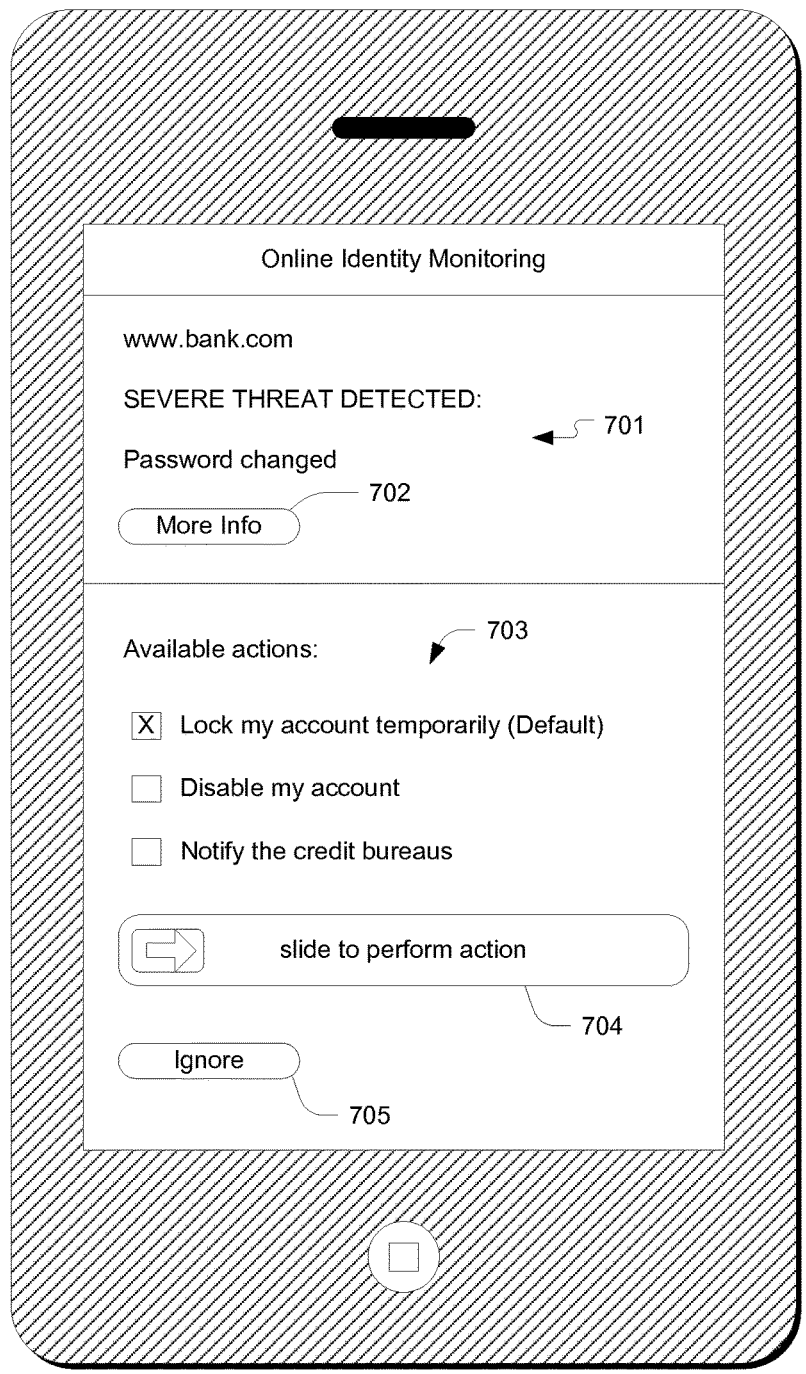
FIG. 7 is a sample notification message user interface that may be displayed on a mobile device as used in an embodiment.

FIG. 7 is a sample user interface with a notification message as displayed on a mobile device, as used in an embodiment. The information provided by the interface may be similar to that shown in the notification email of FIG. 6, and in various embodiments the mobile interface may include less or additional information, or information organized in a different form, as is suitable for the particular mobile device. In other embodiments, notifications may be transmitted to a mobile device via other delivery mechanisms, such as SMS messages, browser-renderable content, standalone applications, etc., which may also allow the user to select protective actions through any of these mechanisms.

The sample interface of FIG. 7 includes information about the detected event 701, as well as options for displaying further information 702. The sample interface further includes options for actions to be taken 703, an interface element to initiate the performance of the actions 704, and an interface element to ignore the event 705. Additional controls and/or information may be included on the mobile interface. In an embodiment, the mobile interface is displayed as a series of screens, in order to reduce the amount of information shown on each screen to accommodate for the smaller available display size on many mobile devices.

Example System Architecture

Figure 8:
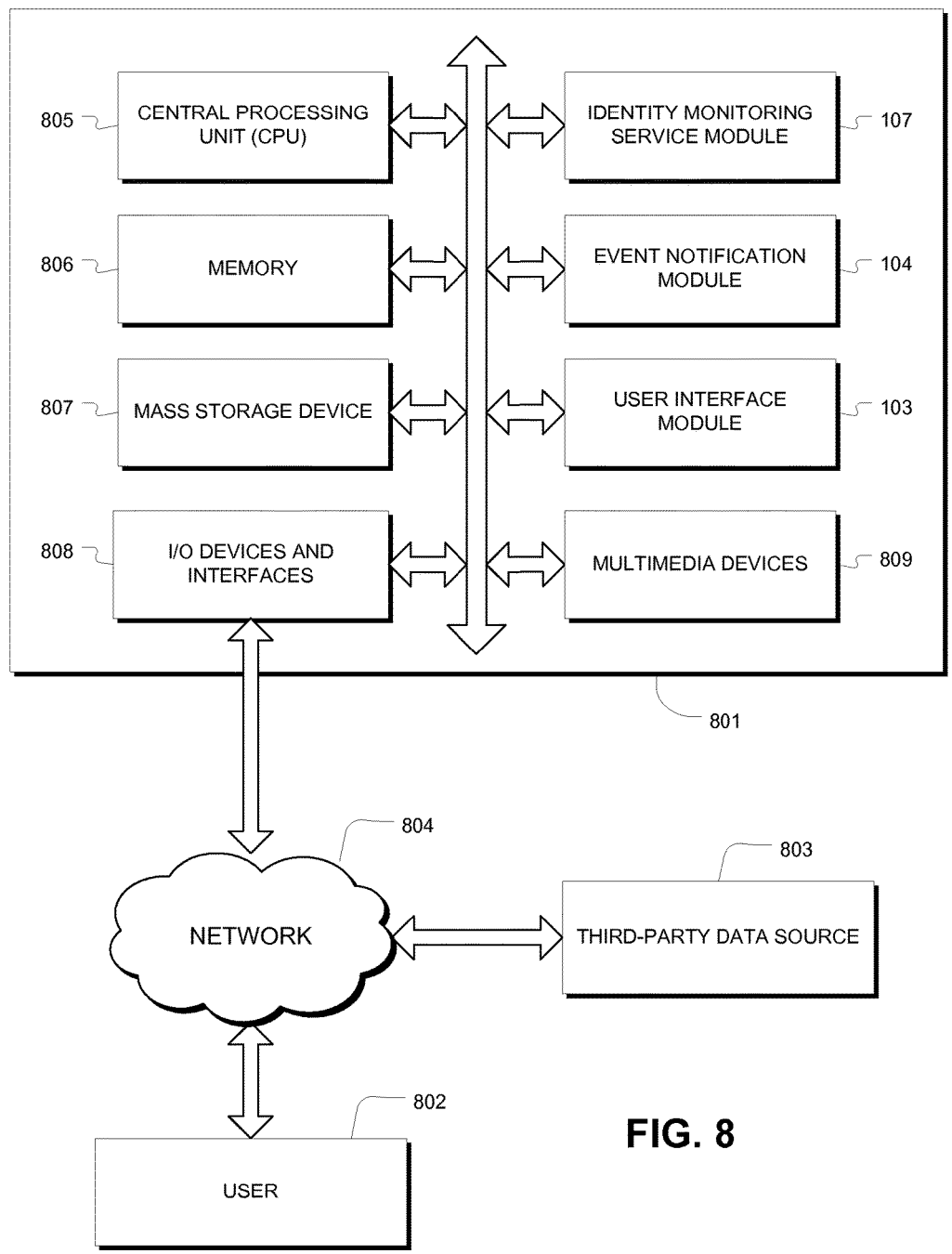
FIG. 8 is a block diagram of a computing system, as used in an embodiment.

FIG. 8 is a block diagram illustrating one embodiment of a computing system that implements the systems and methods described herein. In the embodiment of FIG. 8, a computing device 801 is in communication with a user 802, as well as an optional third-party data source 803, via a network 804. In an embodiment, the computing device 801 receives data, such as credit data, from one or more data sources 803 and accesses the data to identify information regarding one or more entities. The computing device 801 may then perform analysis and prepare information for presentation to the user 802. The management system 101 may include the same or similar components as the computing device 801. Similarly, the computing devices 801 may be used to implement any of the methods discussed herein.

The network 804 may include any communication network or combination of communication networks, such as one or more of the Internet, LANs, WANs, MANs, etc., for example. In the embodiment of FIG. 801, the computing device 801 includes a computing system having one or more computing devices (e.g., computers). The computing device 801 may include, for example, a single computing device, a computer server, a smart storage unit, or a combination of one or more computing devices and/or computer servers. Depending on the embodiment, the components illustrated in the computing device 801 may be distributed amongst multiple devices, such as via a local area or other network connection. In other embodiments the computing device 801 may include fewer and/or additional components that are illustrated in FIG. 8.

The exemplary computing device 801 may be a general purpose computer using one or more microprocessors, such as, for example, an Intel® Pentium® processor, an Intel® Pentium® II processor, an Intel® Pentium® Pro processor, an Intel® Pentium® IV processor, an Intel® Pentium® D processor, an Intel® Core™ processor, an xx86 processor, an 8051 processor, a MIPS processor, a Power PC processor, a SPARC processor, an Alpha processor, and so forth. The computer may run a variety of operating systems that perform standard operating system functions such as, for example, opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Microsoft® Windows® XP, Windows® 7, Palm Pilot OS, Apple® MacOS®, Disk Operating System (DOS), UNIX, IRIX, Solaris, SunOS, FreeBSD, Linux®, or IBM® OS/2® operating systems. In other embodiments, the computing device 801 may be controlled by a proprietary operating system. Conventional operating systems control and schedule computer processes for execution, perform memory management, provide file system, networking, I/O services, and provide a user interface, such as a graphical user interface ("GUI"), among other things.

The computing device 801 includes one or more central processing units ("CPU") 805, which may each include one or more conventional or proprietary microprocessor(s). The computing device 801 may further include one or more memories 806, such as random access memory ("RAM"), for temporary storage of information, read only memory ("ROM") for permanent storage of information, and/or a mass storage device 807, such as a hard drive, diskette, or optical media storage device. The memory 806 may store software code, or instructions, for execution by the processor 805 in order to cause the computing device to perform certain operations, such as gathering sensor-related data, processing the data with statistical and/or predictive models, formatting data for user devices or other presentation, transmitting data, or other operations described or used herein.

The methods described and claimed herein may be performed by any suitable computing device, such as the computing device 801. The methods may be executed on such suitable computing devices in response to execution of software instructions or other executable code read from a non-transitory tangible computer readable medium or computer storage device. A computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

The exemplary computing device 801 may include one or more input/output (I/O) devices and interfaces 808, such as a keyboard, trackball, mouse, drawing tablet, joystick, game controller, touchscreen (e.g., capacitive or resistive touchscreen), touchpad, accelerometer, and/or printer, for example. The computing device 801 may also include one or more multimedia devices 809, such as a display device (also referred to herein as a display screen), which may also be one of the I/O devices 808 in the case of a touchscreen, for example. Display devices may include LCD, OLED, or other thin screen display surfaces, a monitor, television, projector, or any other device that visually depicts user interfaces and data to viewers. The computing device 801 may also include one or more multimedia devices, such as speakers, video cards, graphics accelerators, and microphones, for example.

In the embodiment of FIG. 8, the I/O devices and interfaces 808 provides a communication interface to various external devices via the network 804. For example, the computing device 801 may be electronically coupled to the network 804 via a wired, wireless, or combination of wired and wireless, communication link(s). The network 804 may allow communication with various other computing devices and/or other electronic devices via wired or wireless communication links.

In the embodiment of FIG. 8, the computing device 801 may include an identity monitoring service module 107, an event notification module 104, and a user interface module 103, as well as other modules or fewer modules. The computing device 801 may include fewer or additional modules, such as the email monitoring module 108, the credentials monitoring module 109, and/or the direct notification module 110, which are discussed above with reference to FIG. 1. Each of these modules is discussed in further detail below. In general, the word "module," as used herein, refers to logic embodied in hardware or firmware, or to a collection of software instructions, possibly having entry and exit points, written in any programming language, such as, for example, Java, Python, Perl, Lua, C, C++, C#, Objective C, etc. A software module may be compiled and linked into an executable program, installed in a dynamic link library, or may be written in an interpreted programming language such as, for example, BASIC, Perl, or Python. Software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing device 801, for execution by the computing device. Hardware modules may be comprised of connected logic units, such as gates and flip-flops, and/or may be comprised of programmable units, such as programmable gate arrays or processors. The modules described herein are typically implemented as software modules, but may be implemented in hardware, firmware and/or software. Generally, the modules described herein refer to logical modules that may be combined with other modules or divided into sub-modules despite their physical organization or storage.

Example Modules

In the embodiment of FIG. 8, the computing device 801 includes three modules, namely, an identity monitoring service module 107, an event notification module 104, and a user interface module 103, as well as other modules or fewer modules. In this embodiment, each of the modules is shown as part of the computing device 801. However, in other embodiments, the modules may be distributed across multiple devices, and may be controlled and/or operated by multiple different entities. These modules are configured to perform methods as described throughout this specification. In various embodiments, fewer or additional modules may be included within a computing system.

The computing device 801 may be configured to acquire user data and other external data such as third-party data. The various modules and/or other modules may comprise software alone, hardware alone, or a combination of software and hardware. The device may be especially adapted to communicate using a variety of network or communications protocols in order to communicate with external data sources such as data repositories, network servers, online services, telecommunication services, distributed computing systems, and so on. Some of these protocols may include standard network protocols, such as HTTP, FTP, SNMP, or the like. The device may further include hardware drivers, such as USB, FireWire, Thunderbolt (Light Peak), or serial communications drivers, for example to communicate with devices in direct communication with the system.

The computing device 801 may be configured to transmit, or initiate transmission of, data such as user interfaces, data reports, application programming interface data, or the like, to requesting entities, such as external user 802, that have registered interest with the system. In one embodiment, the device provides the data in an unformatted data structure, such as in an XML, CSV, TXT, or other spreadsheet, text, or web accessible data structure. In other embodiments, the device provides information in user interfaces, such as user interfaces that are configured for rendering by a web browser, mobile device, tablet device, or other device or application, for display to users. A variety of different presentations may be provided. In some embodiments, the requesting entities may indicate presentation preferences or configurations (e.g., data formats and/or types of information), and the device may transmit data based on the indicated preferences or configurations. The presentation format may also be determined based on the type of device being used by the user.

In an embodiment, any or all of the modules 103, 104, and 107-110 are configured to act in real time. Thus, when data is received by the modules, the modules process that data as soon as practicable or necessary to provide users with timely information. In order to achieve this, specialized hardware may be used to gain efficiency, and executable code may be designed to minimize latency or computation time. In an embodiment, the modules, possibly with other modules of the system, are executed within a real-time operating system, to enhance the responsiveness of the system.

SUMMARY

Depending on the embodiment, the methods described with reference to the flowcharts and block diagrams such as FIGS. 1-4 and 8, as well as any other methods discussed herein, may include fewer or additional blocks and/or the blocks may be performed in a different order than is illustrated. Software code configured for execution on a computing device in order to perform the methods may be provided on a computer readable medium, such as a compact disc, digital video disc, flash drive, hard drive, memory device or any other tangible medium. Such software code may be stored, partially or fully, on a memory of a computing device, such as the computing system 101 of FIG. 1 and/or other computing devices illustrated in the Figures, in order to perform the respective methods. For ease of explanation, the method will be described herein as performed by the various modules, such as may be executed on the computing system 101, which should be interpreted to include any one or more of the computing devices noted above and/or any other suitable computing device.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing devices described herein and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of monitoring potential identity theft threats, the method being performed by a monitoring computer having one or more computer processors, the method comprising:
    receiving a request, by the monitoring computer, from a user to monitor a third party account of the user with an online service provider, the request including personal information associated with the third party account;
    periodically monitoring the third party account of the user for indications of changes or attempted changes to personal information associated with the third party account;
    as part of the periodic monitoring,
        detecting a change or attempted change to personal information associated with the third party account;
        determining a risk level associated with the detected change or attempted change to personal information associated with the third party account; and
        determining, based at least in part on the determined risk level, one or more protective actions; and
    transmitting to a user computing device a notification of the detected change or attempted change, and a request to select one or more of the protective actions to be taken in response to the detected change or attempted change;
    receiving from the user computing device an indication of selection of one or more of the protective actions by the user; and
    initiating the one or more protective actions selected by the user.

2. The method of claim 1, wherein periodically monitoring the third party account of the user for indications of changes to personal information comprises periodically connecting to the online service provider associated with the third party account, providing the online service provider with login credentials associated with the user, and determining whether the online service provider accepts the provided login credentials.

3. The method of claim 2, wherein periodically monitoring the third party account of the user for indications of changes to personal information further comprises, after the online service provider accepts the provided login credentials:
    retrieving personal information associated with the third party account from the online service provider;
    comparing personal information retrieved from the online service provider with personal information provided in the user request; and
    determining whether personal information retrieved from the online service provider matches personal information provided in the user request.

4. The method of claim 1, wherein periodically monitoring the third party account of the user for indications of changes or attempted changes to personal information comprises periodically retrieving or receiving electronic messages associated with the user and analyzing content of the retrieved or received messages to determine whether any of the messages indicates a change or attempted change to personal information.

5. The method of claim 1, wherein the risk level is determined at least in part based on whether a preauthorization for the detected change or attempted change to personal information was received.

6. The method of claim 1, wherein the risk level is determined at least in part based on a determination of a likelihood that the detected change or attempted change is non-anomalous, known, and/or authorized by the user.

7. The method of claim 1, wherein the user computing device to which the notification of the detected change or attempted change is transmitted is determined in part based on the determined risk level.

8. A method of monitoring potential identity theft threats, the method being performed by a monitoring computer having one or more computer processors, the method comprising:
- receiving a request, by the monitoring computer, from a user to monitor an electronic communication account or device of the user;
- periodically monitoring electronic communications in the electronic communication account or device of the user for changes, possible changes, or attempted changes to personal information associated with another account of the user;
- as part of the periodic monitoring, detecting a change, a possible change, or an attempted change to personal information associated with said another account of the user;
- determining a risk level associated with the detected change, possible change, or attempted change to personal information associated with said another account of the user; and
- determining, based at least in part on the determined risk level, one or more protective actions; and
- transmitting to a user computing device a notification of the detected change, possible change, or attempted change, and a request to select one or more of the protective actions to be taken in response to the detected change, possible change, or attempted change;
- receiving from the user computing device an indication of selection of one or more of the protective actions by the user; and
- initiating the one or more protective actions selected by the user.

9. The method of claim 8, wherein periodically monitoring electronic communications in the electronic communication account or device of the user comprises periodically logging into the electronic communication account or device of the user, gathering messages from the electronic communication account or device, and determining whether the gathered messages indicate a change, possible change, or attempted change to personal information associated with another account of the user.

10. The method of claim 8, wherein periodically monitoring electronic communications in the electronic communication account or device of the user comprises receiving messages sent from the electronic communication account or device to the monitoring computer and analyzing content of the received messages to determine whether any of the messages indicates a change, possible change, or attempted change to personal information associated with another account of the user.

11. The method of claim 8, wherein the risk level is determined at least in part based on whether a preauthorization for the detected change, possible change, or attempted change to personal information was received.

12. The method of claim 8, wherein the risk level is determined at least in part based on a determination of a likelihood that the detected change, possible change, or attempted change is non-anomalous, known, and/or authorized by the user.

13. The method of claim 8, wherein the user computing device to which the notification of the detected change, possible change, or attempted change is transmitted is determined in part based on the determined risk level.

14. A computing system configured to monitor and handle potential identity theft threats, comprising:
- a non-transitory computer-readable storage medium having stored thereon a plurality of executable software modules;
- a network interface; and
- one or more computer hardware processors configured to execute the plurality of executable software modules stored on the computer-readable storage medium, wherein the one or more processors execute:
  - a credentials monitoring module to
    - access a third party account of a user and determine whether a response from the third party account indicates a change or attempted change to personal information associated with the third party account of the user;
    - determine a risk level associated with the detected change or attempted change to personal information associated with the third party account of the user; and
    - determine, based at least in part on the determined risk level, one or more protective actions;
  - an event notification module to transmit, via the network interface, to a user computing device a notification of the detected change or attempted change and a request to select one or more of the protective actions to be taken in response to the detected change or attempted change;
  - a user interface module to receive, via the network interface, from the user computing device an indication of selection of one or more of the protective actions by the user; and
  - the event notification module further to execute the one or more protective actions selected by the user.

15. The computing system of claim 14, wherein the user computing device to which the notification of the detected change or attempted change is transmitted is determined in part based on the determined risk level.

* * * * *